United States Patent
Rune et al.

(10) Patent No.: US 7,054,638 B2
(45) Date of Patent: May 30, 2006

(54) CONTROLLING TRANSMISSION OF CELL INFORMATION BETWEEN CONTROL NODES IN RADIO ACCESS NETWORK

(75) Inventors: Göran Rune, Linköping (SE); Gert-Jan Van Lieshout, Apeldoorn (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 550 days.

(21) Appl. No.: 10/022,830

(22) Filed: Dec. 20, 2001

(65) Prior Publication Data

US 2002/0094817 A1   Jul. 18, 2002

Related U.S. Application Data

(60) Provisional application No. 60/260,901, filed on Jan. 12, 2001.

(51) Int. Cl.
    *H04Q 7/20* (2006.01)
(52) U.S. Cl. .................. 455/450; 455/436; 455/433; 455/453; 455/435.1; 455/435.2; 455/438; 455/428; 455/429; 455/432.1; 455/434; 455/437; 455/442; 455/443; 455/449; 455/456.5
(58) Field of Classification Search .............. 455/450, 455/436, 453, 433, 435.1, 435.2, 438, 428, 455/429, 432.1, 434, 437, 442, 443, 449, 455/456.5
See application file for complete search history.

(56) References Cited

U.S. PATENT DOCUMENTS 5,497,504 A   3/1996   Acampora et al.

(Continued)

FOREIGN PATENT DOCUMENTS

WO   95/08898   3/1995

(Continued)

OTHER PUBLICATIONS

International Preliminary Examination Report mailed Dec. 4, 2002 in corresponding PCT Application PCT/SE02/00051.

(Continued)

*Primary Examiner*—Joseph Feild
*Assistant Examiner*—David Q. Nguyen
(74) *Attorney, Agent, or Firm*—Nixon & Vanderhye, P.C.

(57) ABSTRACT

A telecommunications network simplifies data flow and signaling by having a second control node ($26_2$) of a radio access network transmit cell information to a first control node ($26_1$) only when the cell information is not already known by the first control node. The invention is facilitated by a cell configuration generation index (CCGI). The cell configuration generation index (CCGI) represents a set of cell information parameters deemed current for a specified cell by a control node. In one example embodiment, the cell configuration generation index (CCGI)is a counter whose value is changed when configuration data of the specified cell is changed. In one example scenario, a cell identifier for the specified cell and the first control node's CCGI for the specified cell are included in a request message sent from the first control node to the second control node. If the second control node determines that the first control node's CCGI for the specified cell is current, no cell information for the specified cell need be sent by the second control node to the first control node in response. However, if the second control node determines that the first control node's CCGI for the specified cell is not current, the second control node includes in a response message both (1) the cell information deemed current by the second control node for the specified cell; and (2) second control node's CCGI (which is current and accurate) for the specified cell.

52 Claims, 18 Drawing Sheets

U.S. PATENT DOCUMENTS

| | | | |
|---|---|---|---|
| 5,530,917 A | 6/1996 | Andersson et al. | |
| 5,913,167 A | 6/1999 | Bonta et al. | |
| 6,233,222 B1 | 5/2001 | Wallentin | |
| 2001/0018345 A1* | 8/2001 | Longoni et al. | 455/436 |
| 2002/0051431 A1 | 5/2002 | Choi et al. | |
| 2002/0052206 A1* | 5/2002 | Longoni | 455/453 |
| 2002/0164985 A1* | 11/2002 | Saada et al. | 455/436 |

FOREIGN PATENT DOCUMENTS

| | | |
|---|---|---|
| WO | 95/15665 | 6/1995 |
| WO | 95/20865 | 8/1995 |
| WO | 96/26620 | 8/1996 |
| WO | 97/41698 | 11/1997 |
| WO | 98/32303 | 7/1998 |
| WO | 98/59505 | 12/1998 |
| WO | 99/39528 A1 | 8/1999 |
| WO | 99/41850 A2 | 8/1999 |
| WO | 99/45736 | 10/1999 |
| WO | 99/51051 A2 | 10/1999 |
| WO | 99/53668 | 10/1999 |
| WO | 00/76245 A1 | 12/2000 |
| WO | WO 00/76245 A1 * | 12/2000 |
| WO | 01/39534 A1 | 5/2001 |

OTHER PUBLICATIONS

Cheung, et al, "Network Configurations for Seamless Support of CDMA Soft Handoffs Between Cell-Clusters", Dept. of Electrical Engineering, The University of British Columbia, 0-7803-3300-Apr. 1996 © 1996, pp. 295-299.

Jones, et al., IS-634 revision A—part 1 (IS-634.1 rev A) (PN-3539) 2nd Ballot Version—Draft for V&V, Part 1—Common Protocol and Part 5—Protocol Details, Oct. 27, 1997.

"Digital Cellular Telecommunications System (Phase 2+); Mobile Application Part (MAP) Specification (GSM 09.02 version 5.8.0)", European Telecommunications Standard Institute; Draft pr ETS 300 974, Feb. 1998.

"Cellular Radiotelecommunications Intersystem Operations", ANSI-41-D (Former (TIA/EIA IS-41-C), pp. 2-5-2-14, 2-25-2-30.

Simmons et al., "Switching Handovers in Microcellular Mobile Networks: An Architectural Evolution", Proceedings of the International Switching Symposium, Yokohama, Oct. 25-30, 1992, vol. 1, No. SYMP. 14, Oct. 25, 1992, pp. 108-112, XP000337626 Institute of Electronics; Information and Communication Engineers.

Patent Abstracts of Japan JP 02094829 (Nippon Telegr & Teleph Corp) May 4, 1990.

* cited by examiner

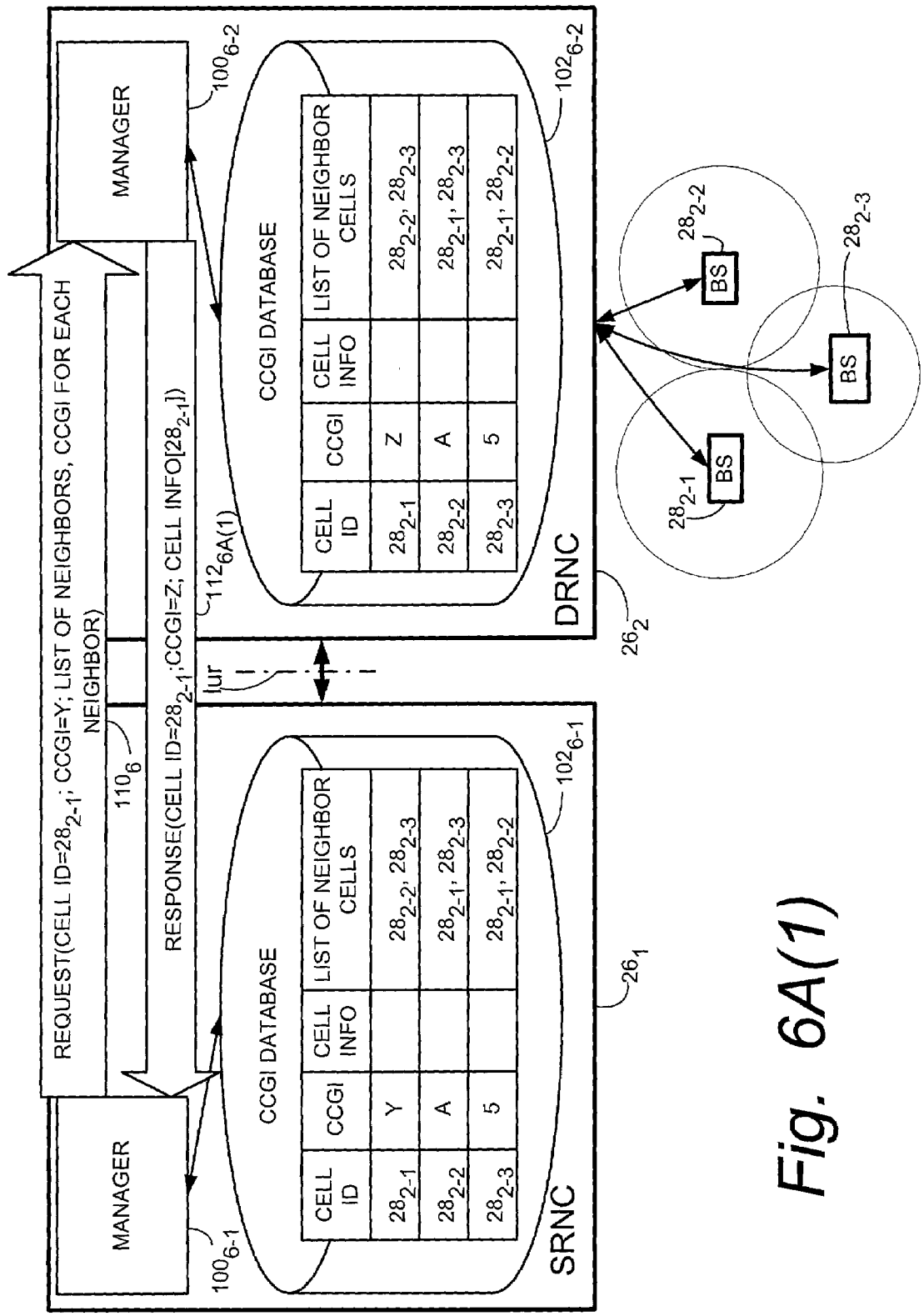
Fig. 6A(1)

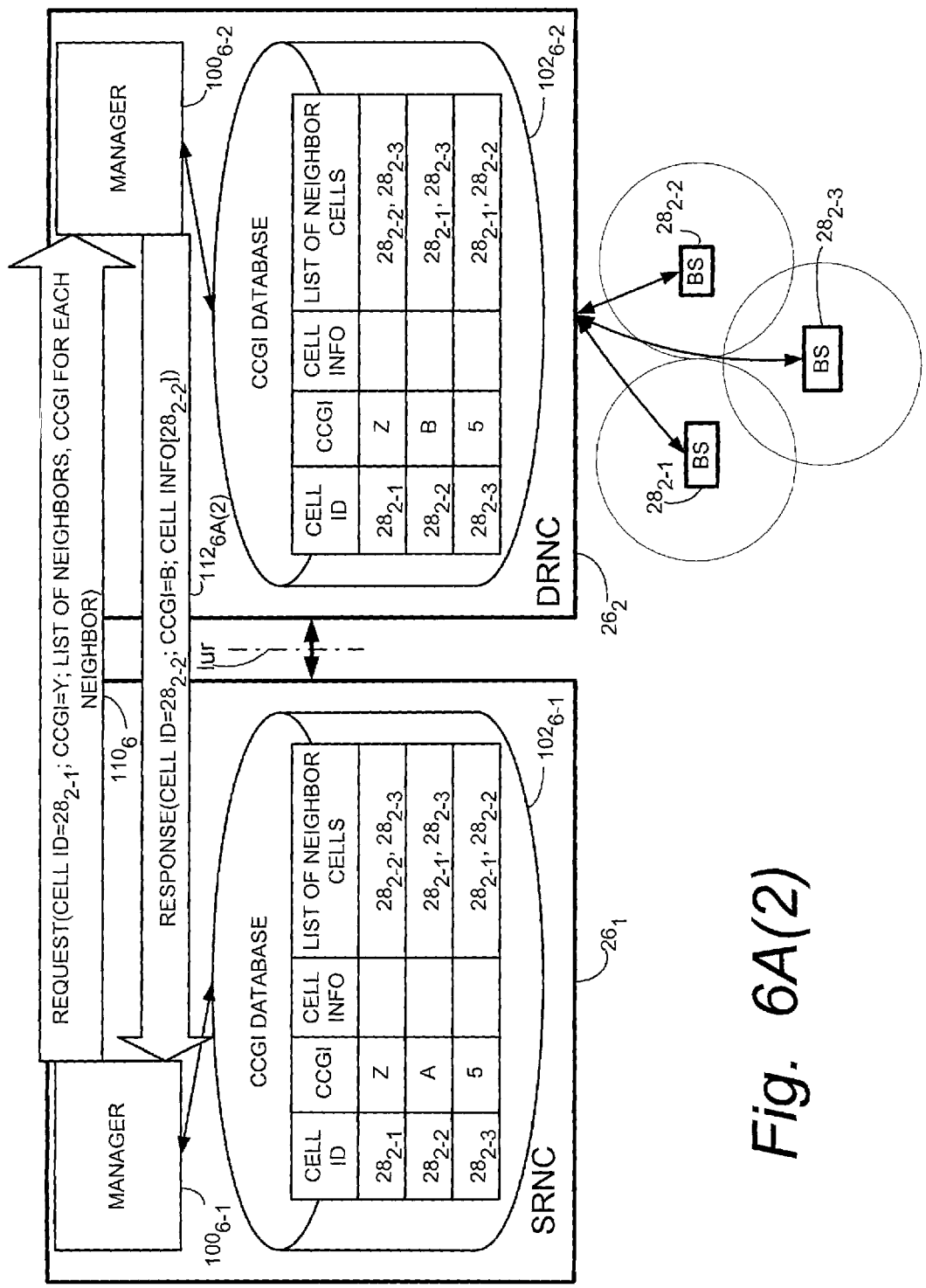
Fig. 6A(2)

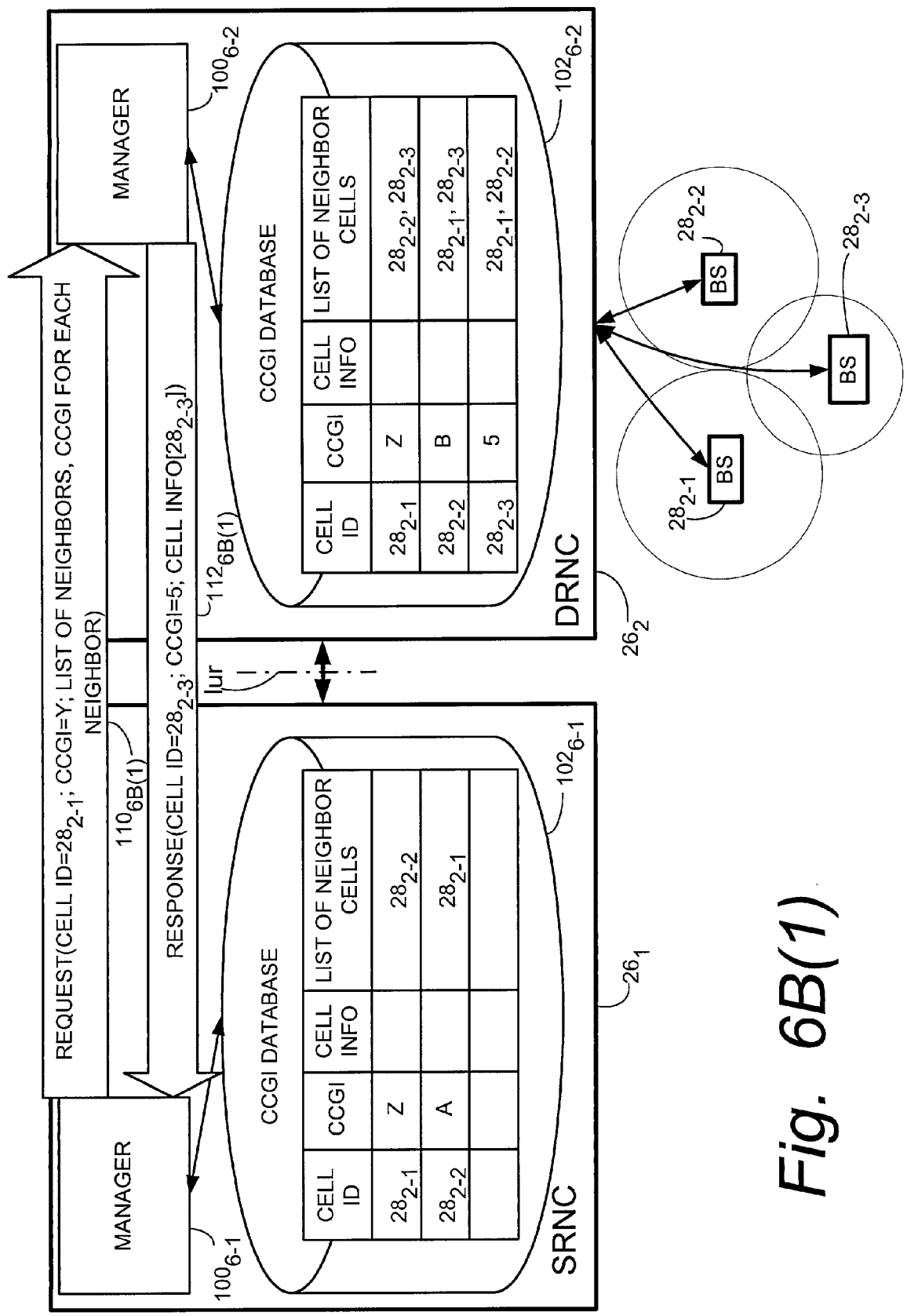
Fig. 6B(1)

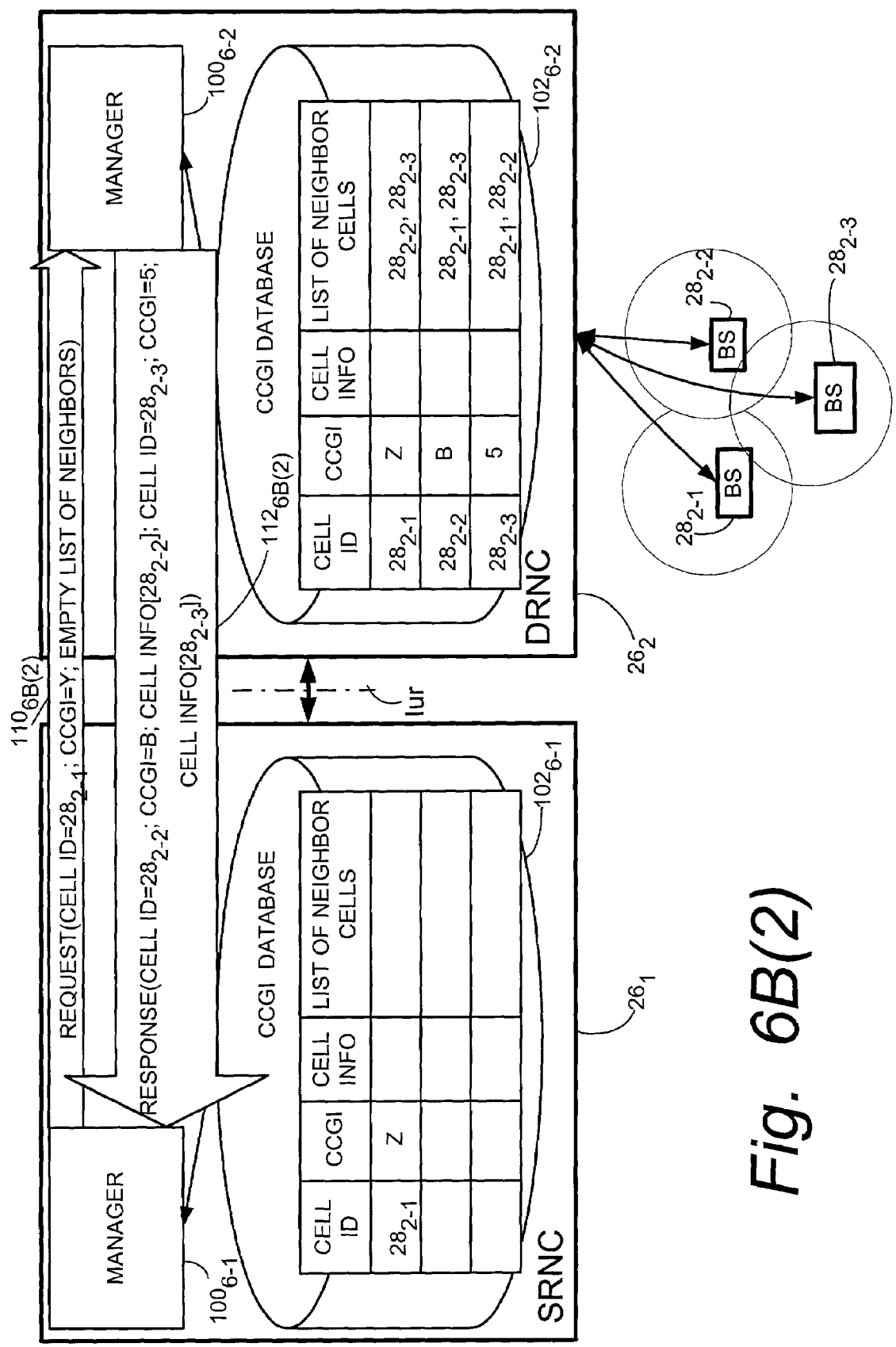
Fig. 6B(2)

CONTROLLING TRANSMISSION OF CELL INFORMATION BETWEEN CONTROL NODES IN RADIO ACCESS NETWORK

This application claims the priority and benefit of U.S. Provisional Patent Application No. 60/260,901, filed Jan. 12, 2000, which is incorporated herein by reference in its entirety.

BACKGROUND

1. Field of the Invention

The present invention pertains to telecommunications, and particularly to the transmission of cell information between control nodes of a radio access network.

2. Related Art and Other Considerations

In a typical cellular radio system, mobile user equipment units (UEs) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station. A cell is a geographical area where radio coverage is provided by the radio base station equipment at a base station site. Each cell is identified by a unique identity, which is broadcast in the cell. The base stations communicate over the air interface (e.g., radio frequencies) with the user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

One example of a radio access network is the Universal Mobile Telecommunications (UMTS) Terrestrial Radio Access Network (UTRAN). The UTRAN is a third generation system which is in some respects builds upon the radio access technology known as Global System for Mobile communications (GSM) developed in Europe. UTRAN is essentially a wideband code division multiple access (W-CDMA) system.

As those skilled in the art appreciate, in W-CDMA technology a common frequency band allows simultaneous communication between a user equipment unit (UE) and plural base stations. Signals occupying the common frequency band are discriminated at the receiving station through spread spectrum CDMA waveform properties based on the use of a high speed, pseudo-noise (PN) code. These high speed PN codes are used to modulate signals transmitted from the base stations and the user equipment units (UEs). Transmitter stations using different PN codes (or a PN code offset in time) produce signals that can be separately demodulated at a receiving station. The high speed PN modulation also allows the receiving station to advantageously generate a received signal from a single transmitting station by combining several distinct propagation paths of the transmitted signal. In CDMA, therefore, a user equipment unit (UE) need not switch frequency when handoff of a connection is made from one cell to another. As a result, a destination cell can support a connection to a user equipment unit (UE) at the same time the origination cell continues to service the connection. Since the user equipment unit (UE) is always communicating through at least one cell during handover, there is no disruption to the call. Hence, the term "soft handover." In contrast to hard handover, soft handover is a "make-before-break" switching operation.

There are several interfaces of interest in the UTRAN. The interface between the radio network controllers (RNCs) and the core network(s) is termed the "Iu" interface. The interface between a radio network controller (RNC) and its base stations (BSs) is termed the "Iub" interface. The interface between the user equipment unit (UE) and the base stations is known as the "air interface" or the "radio interface". In some instances, a connection involves both a Serving or Source RNC (SRNC) and a target or drift RNC (DRNC), with the SRNC controlling the connection but with one or more diversity legs of the connection being handling by the DRNC. The interface between a SRNC and a DRNC is termed the "Iur" interface. An understanding of the functions performed by the SRNC, the DRNC, and the type of information exchanged therebetween can be gleaned from one or more of the following (all of which are incorporated herein by reference) U.S. patent application Ser. No. 09/035,821 filed Mar. 6, 1998, entitled "Telecommunications Inter-Exchange Measurement Transfer"; U.S. patent application Ser. No. 09/035,788 filed Mar. 6, 1998, entitled "Telecommunications Inter-Exchange Congestion Control"; U.S. patent application Ser. No. 09/638,858 filed Aug. 15, 2000, entitled "Transfer of Overlapping Routing Area Control Information In A Radio Access Network"; and U.S. patent application Ser. No. 09/543,536 filed Apr. 5, 2000, entitled "Relocation of Serving Radio Network Controller With Signaling of Linking of Dedicated Transport Channels".

When it is appropriate to establish a new leg of a connection controlled by a SRNC through a base station controlled by a DRNC, the SRNC typically requests that the DRNC allocate resources (e.g., radio link resources) for the new leg of the connection in the cell served by the base station which will host the new leg. The Third Generation Partnership Project (3GPP), which has undertaken to evolve further the UTRAN and GSM-based radio access network technologies, proposes in its specifications that the DRNC transmit or transfer cell information for each cell where radio resources are being established. See, e.g., 3G TS 25.423, v.3.4.0: UTRAN Iur Interface RNSAP Signaling (ftp://ftp.3gpp.org/Specs/2000-12R/R1999/25 series/25423-340.zip). The transfer of cell information as proposed by the 3GPP means that, if an SRNC requests resources in a particular cell for many users (UEs), the SRNC will in response receive the same cell information many times (once for each user) from the DRNC. Such redundancy is inefficient and consume unnecessary bandwidth in the signaling network and causes additional signaling delay.

What is needed, therefore, and an object of the present invention, is an efficient and economical technique for communicating cell information between radio network control nodes of a radio access network.

BRIEF SUMMARY OF THE INVENTION

A telecommunications network simplifies data flow and signaling by having a second control node of a radio access network transmit cell information to a first control node only when the cell information is not already known by the first control node. The invention is facilitated by a cell configuration generation index (CCGI). The cell configuration generation index (CCGI) represents a set of cell information parameters deemed current for a specified cell by a control node. In one example embodiment, the cell configuration generation index (CCGI) is a counter whose value is changed when configuration data of the specified cell is changed.

In one example scenario, a cell identifier for the specified cell and the first control node's CCGI for the specified cell are included in a request message sent from the first control node to the second control node. If the second control node determines that the first control node's CCGI for the specified cell is current, no cell information for the specified cell need be sent by the second control node to the first control node in response. However, if the second control node determines that the first control node's CCGI for the specified cell is not current, the second control node includes in a response message both (1) the cell information deemed current by the second control node for the specified cell; and (2) the second control node's CCGI (which is current and accurate) for the specified cell.

In another example scenario, if the request message sent from the first control node to the second control node contains only a cell identifier for the specified cell and not a CCGI for the specified cell, a response message sent from the second control node to the first control node includes both (1) the cell information deemed current by the second control node for the specified cell; and (2) the second control node's CCGI (which is current and accurate) for the specified cell.

In one mode of the invention, the cell information includes a set of cell information parameters characterizing the specified cell served by a base station controlled by the second control node. In another mode of the invention, the cell information can optionally include a set of cell information parameters which characterizes at least one cell which neighbors the specified cell (and preferably all the cells which neighbor the specified cell).

The first control node and the second control node can, in illustrated embodiments, both be radio network control nodes of a radio access network. More particularly, in one example implementation the first control node is a Serving Radio Network Control (SRNC) node and the second control node is a Drift Radio Network Control (DRNC) node. In the context of this example implementation, the request message sent by the first control node to the second control node can be a message which requests that the second control node allocate resources in the specified cell for a connection controlled by the first control node (e.g., a radio link setup request message or a radio link addition request message). The response message can be of the nature of a radio link setup response message or a radio link addition response message. The request and response messages of the present invention are not, however, limited to or necessarily confined to resource allocation, as the request message can instead take the form of a status or update request or the like for ascertaining the actual current cell information for the specified cell [and/or optionally the neighboring cell(s)].

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
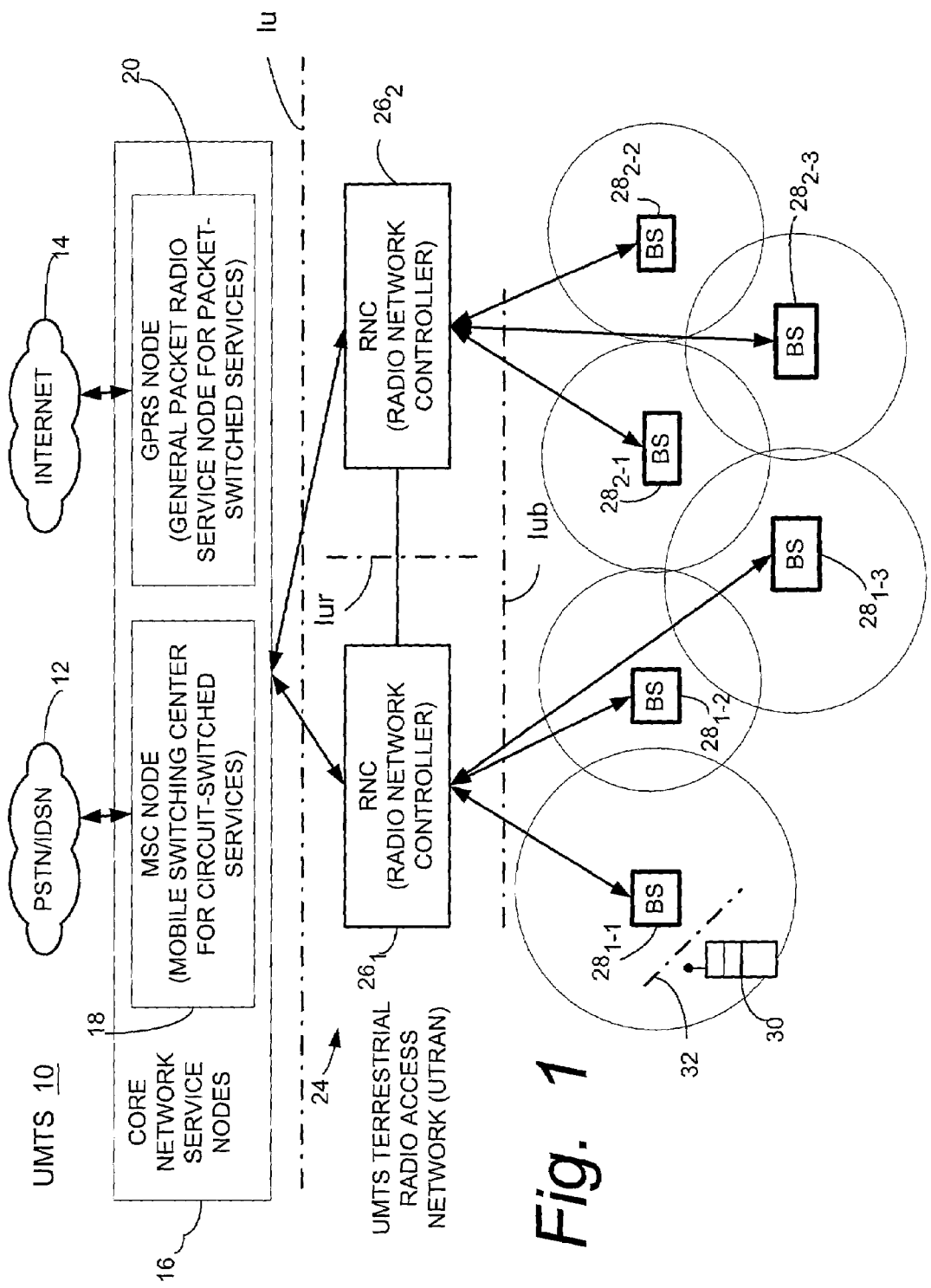
FIG. 1 is diagrammatic view of example mobile communications system in which the present invention may be advantageously employed.

The present invention is described in the non-limiting, example context of a universal mobile telecommunications (UMTS) 10 shown in FIG. 1. A representative, connection-oriented, external core network, shown as a cloud 12 may be for example the Public Switched Telephone Network (PSTN) and/or the Integrated Services Digital Network (ISDN). A representative, connectionless-oriented external core network shown as a cloud 14, may be for example the Internet. Both core networks are coupled to corresponding service nodes 16. The PSTN/ISDN connection-oriented network 12 is connected to a connection-oriented service node shown as a Mobile Switching Center (MSC) node 18 that provides circuit-switched services. The Internet connectionless-oriented network 14 is connected to a General Packet Radio Service (GPRS) node 20 tailored to provide packet-switched type services which is sometimes referred to as the serving GPRS service node (SGSN).

Each of the core network service nodes 18 and 20 connects to a UMTS Terrestrial Radio Access Network (UTRAN) 24 over a radio access network (RAN) interface referred to as the Iu interface. UTRAN 24 includes one or more radio network controllers (RNCs) 26 and one or more base stations (BS) 28. For sake of simplicity, the UTRAN 24 of FIG. 1 is shown with only two RNC nodes, particularly RNC $26_1$ and RNC $26_2$. Each RNC 26 is connected to one or more base stations (BS) 28. For example, and again for sake of simplicity, two base station nodes are shown connected to each RNC 26. In this regard, RNC $26_1$ serves base station $28_{1-1}$, base station $28_{1-2}$, and base station $28_{1-3}$, while RNC $26_2$ serves base station $28_{2-1}$ base station $28_{2-2}$, and base station $28_{2-3}$. It will be appreciated that a different number of base stations can be served by each RNC, and that RNCs need not serve the same number of base stations. Moreover, FIG. 1 shows that an RNC can be connected over an Iur interface to one or more other RNCs in the UTRAN 24.

A user equipment unit (UE), such as user equipment unit (UE) 30 shown in FIG. 1, communicates with one or more base stations (BS) 28 over a radio or air interface 32. Each of the radio interface 32, the Iu interface, the Iub interface, and the Iur interface are shown by dash-dotted lines in FIG. 1. Preferably, radio access is based upon wideband, Code Division Multiple Access (WCDMA) with individual radio channels allocated using CDMA spreading codes. Of course, other access methods may be employed. WCDMA provides wide bandwidth for multimedia services and other high transmission rate demands as well as robust features like diversity handoff and RAKE receivers to ensure high quality. Each user mobile station or equipment unit (UE) 30 is assigned its own scrambling code in order for a base station 28 to identify transmissions from that particular user equipment unit (UE) as well as for the user equipment unit (UE) to identify transmissions from the base station intended for that user equipment unit (UE) from all of the other transmissions and noise present in the same area.

Different types of control channels may exist between one of the base stations 28 and user equipment units (UEs) 30. For example, in the forward or downlink direction, there are several types of broadcast channels including a general broadcast channel (BCH), a paging channel (PCH), a common pilot channel (CPICH), and a forward access channel (FACH) for providing various other types of control messages to user equipment units (UEs). In the reverse or uplink direction, a random access channel (RACH) is employed by user equipment units (UEs) whenever access is desired to perform location registration, call origination, page response, and other types of access operations. The random access channel (RACH) is also used for carrying certain user data, e.g., best effort packet data for, e.g., web browser applications. Traffic channels (TCH) may be allocated to carry substantive call communications with a user equipment unit (UE).

When a connection between the radio access network (RAN) and user equipment unit (UE) is being established, the radio access network (RAN) decides which RNC is to be the serving RNC (SRNC) and, if needed, which RNC is to be a drift RNC (DRNC). Normally, the RNC that controls the cell where the user equipment unit (UE) is located when the connection is first established is initially selected as the serving RNC (SRNC). As the user equipment unit (UE) moves, the connection is maintained by establishing radio communication branches or legs via new cells, possibly cells controlled by other RNCs. Those other RNCs become drift RNCs (DRNC) for RAN-UE connection.

Figure 1A:
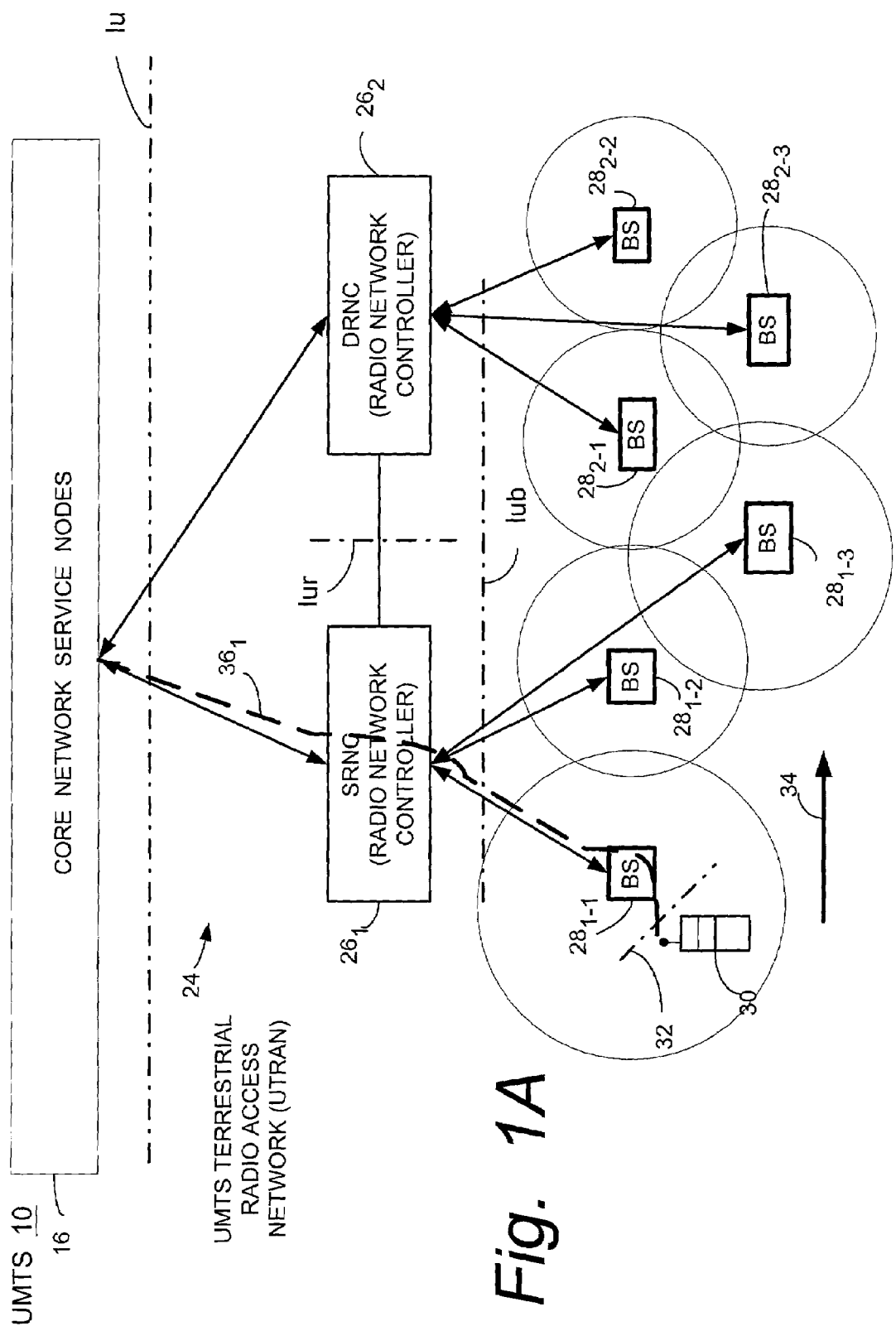
FIG. 1A is a diagrammatic view illustrating a setup of a connection with a user equipment unit (UE).

To illustrate the foregoing, and as a prelude to an explanation of the present invention, reference is made to the situation shown in FIG. 1A. FIG. 1A shows an example of RNC role assignment for user equipment unit (UE) 30 at initial setup of a connection involving user equipment unit (UE) 30. In FIG. 1A, radio network controller (RNC) $26_1$ acts as the serving RNC (SRNC) for the connection with user equipment unit (UE) 30, since user equipment unit (UE) 30 is in the cell controlled by base station (BS) $28_{1-1}$ when the connection is first established. An initial leg of the connection with user equipment unit (UE) 30 in FIG. 1A is shown by the broken line $36_1$ (which extends from core network 16, through radio network controller (RNC) $26_1$, and base station (BS)$28_{1-1}$ to user equipment unit (UE) 30). While it is assumed that the connection with user equipment unit (UE) 30 has a user connected to the core network as the second party, it should be understood that the second party could instead be another user equipment unit (UE), e.g., a mobile telephone.

Figure 1B:
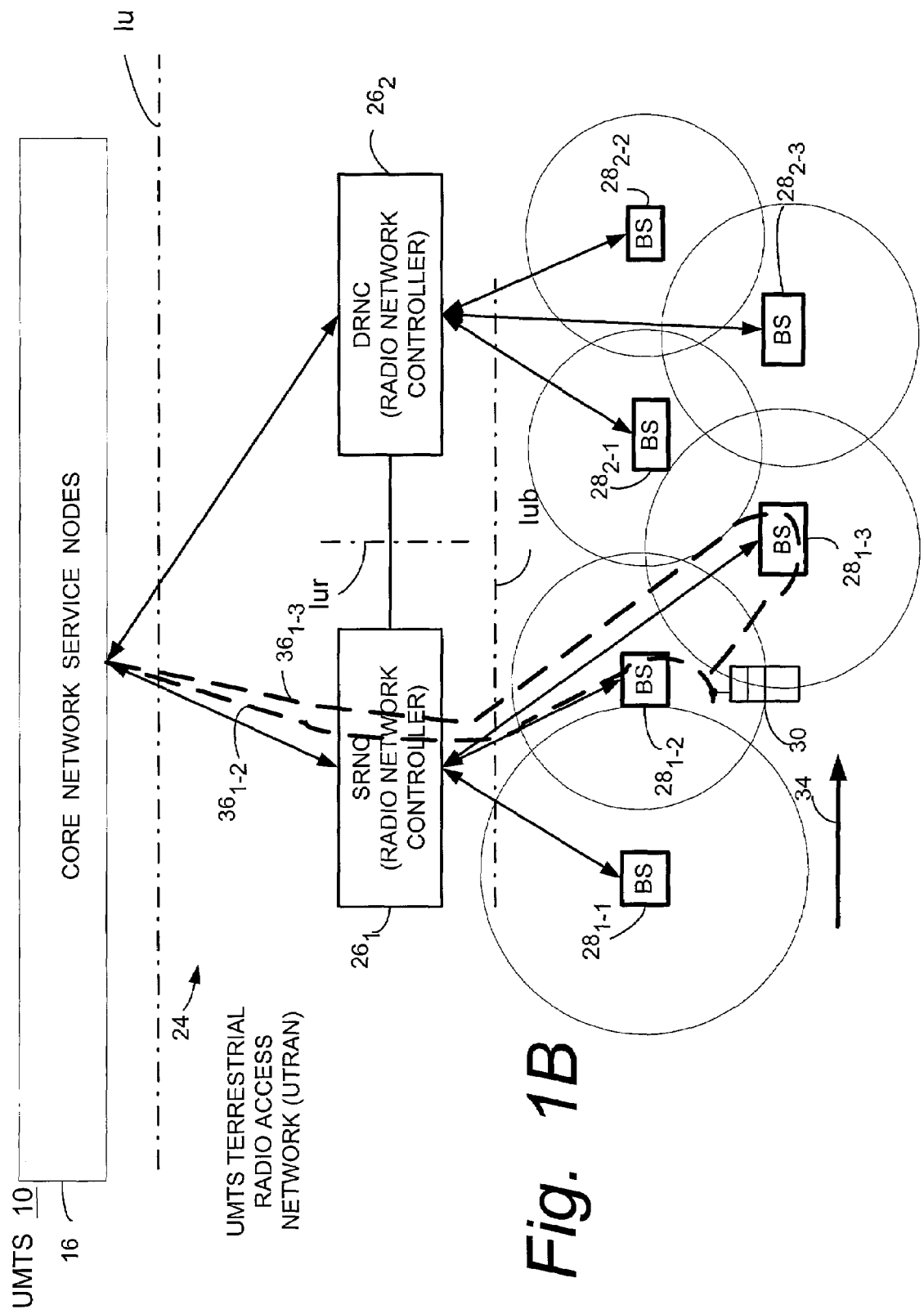
FIG. 1B is a diagrammatic view illustrating transit of the user equipment unit (UE) of FIG. 1A and setup of further connection legs therefor.

Suppose that user equipment unit (UE) 30 travels in the rightward direction indicated by arrow 34 to the location shown in FIG. 1B. At the location of user equipment unit (UE) 30 it so happens that the connection involving user equipment unit (UE) 30 now has two legs. The initial leg through base station (BS) $28_{1-1}$ is no longer viable and has been removed. One present leg of the connection, shown by the broken line $36_{1-2}$, is through base station (BS) $28_{1-2}$. Another present leg of the connection, shown by the broken line $36_{1-3}$, is through base station (BS) $28_{1-3}$. When it became apparent that each of legs depicted by broken line $36_{1-2}$, and broken line $36_{1-3}$ should be established, the SRNC $26_1$ allocated radio link resources for each leg in the respective cells.

Figure 1C:
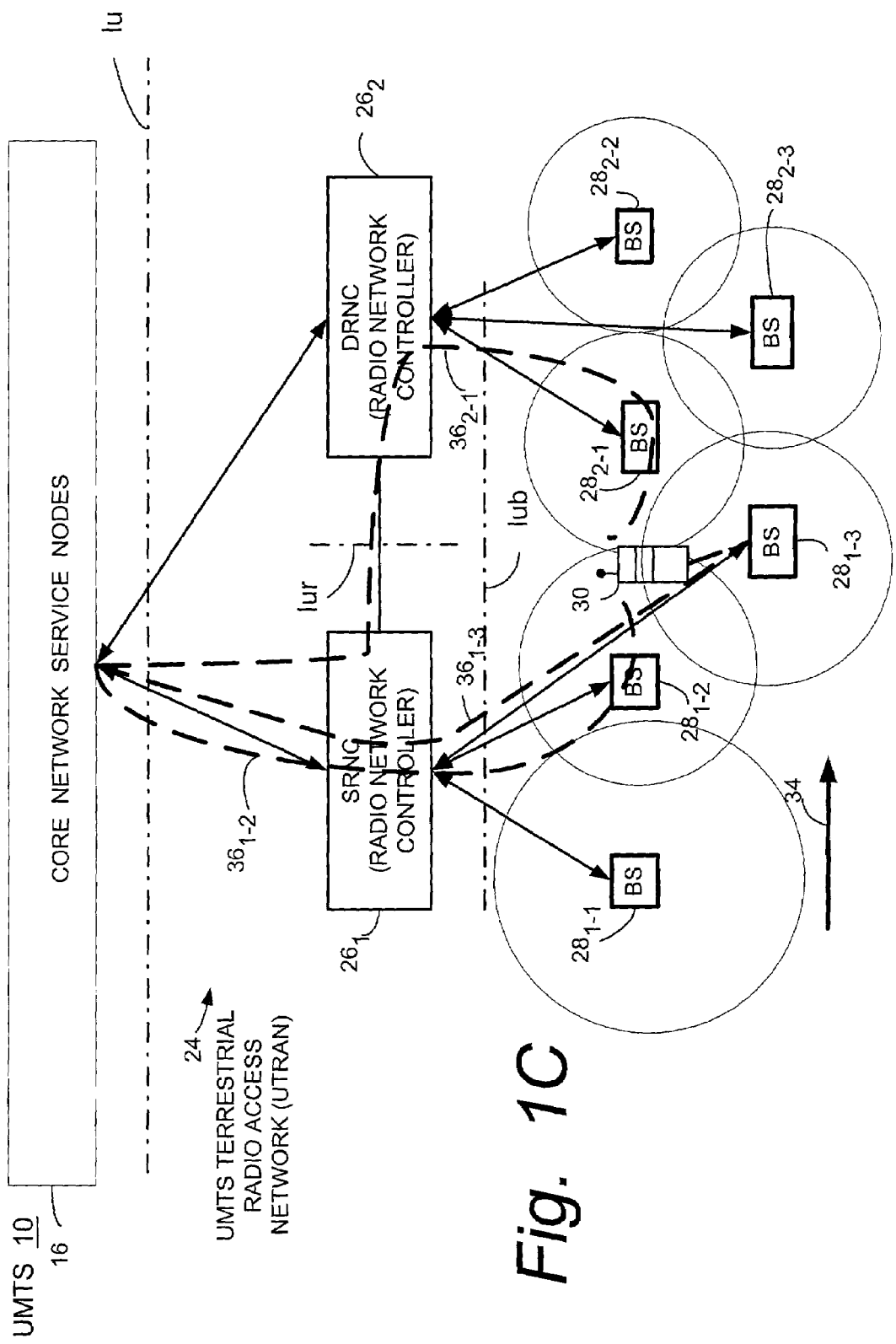
FIG. 1C is a diagrammatic view illustrating further transit of the user equipment unit (UE) of FIG. 1B and setup of yet further connection legs therefor in a cell controlled by a Drift RNC.

FIG. 1C shows the user equipment unit (UE) 30 traveling even further in the rightward direction indicated by arrow 34. With the location of user equipment unit (UE) 30 as shown in FIG. 1C, a further leg of the connection through base station (BS) $28_{2-1}$ (indicated by the broken line $36_{2-1}$) is appropriate. Notably, the base station (BS) $28_{2-1}$ is controlled by RNC $26_2$, which will function as a Drift RNC (DRNC) for the connection (which is controlled by SRNC $26_1$). In order to establish the leg of the connection through base station (BS) $28_{2-1}$, the SRNC $26_1$ must request the DRNC $26_2$ to allocate radio link resources for the connection leg (e.g., the leg indicated by the broken line $36_{2-1}$).

The request from a SRNC for a DRNC to allocate radio link resources is just one example event in which cell information (about a cell served by a base station controlled by the DRNC) is communicated over the Iur interface (e.g., from the DRNC to the SRNC). As used herein, "cell information" for a certain cell refers to a set of cell information parameters which characterize that certain cell.

One example of the type of information parameters included in the set are the information items listed for a FDD cell (e.g., for the FDD mode of UTRAN) in the Radio Link Setup procedure in 99 3GPP TS 25.423 v3.4.0. Those cell information items are the following: (1) URA Information (UTRAN Registration Area Information); (2) SAI (Service Area Identity); (3) Cell GAI (Cell Geographical Area Information); (4) UTRAN Access Point Position; (5) SSDT Support Indicator (Site Selection Discontinuous Transmission Support Indicator); (6) Closed Loop Timing Adjustment Mode; (7) Primary Scrambling Code; (8) UL UARFCN (Uplink UTRA Absolute Radio Frequency Channel Number); (9) DL UARFCN (Downlink UTRA Absolute Radio Frequency Channel Number); (10) Primary CPICH Power (Primary Common PIlot CHannel Power)

Thus, the cell information comprises a considerable amount of data. In view of the sheer amount of such data, and the bandwidth requirements and signaling delays associated therewith, the present invention pertains to economic and efficient control of the transmission of such cell information between control nodes in a radio access network, e.g., between SRNC and DRNC nodes.

Figure 2:
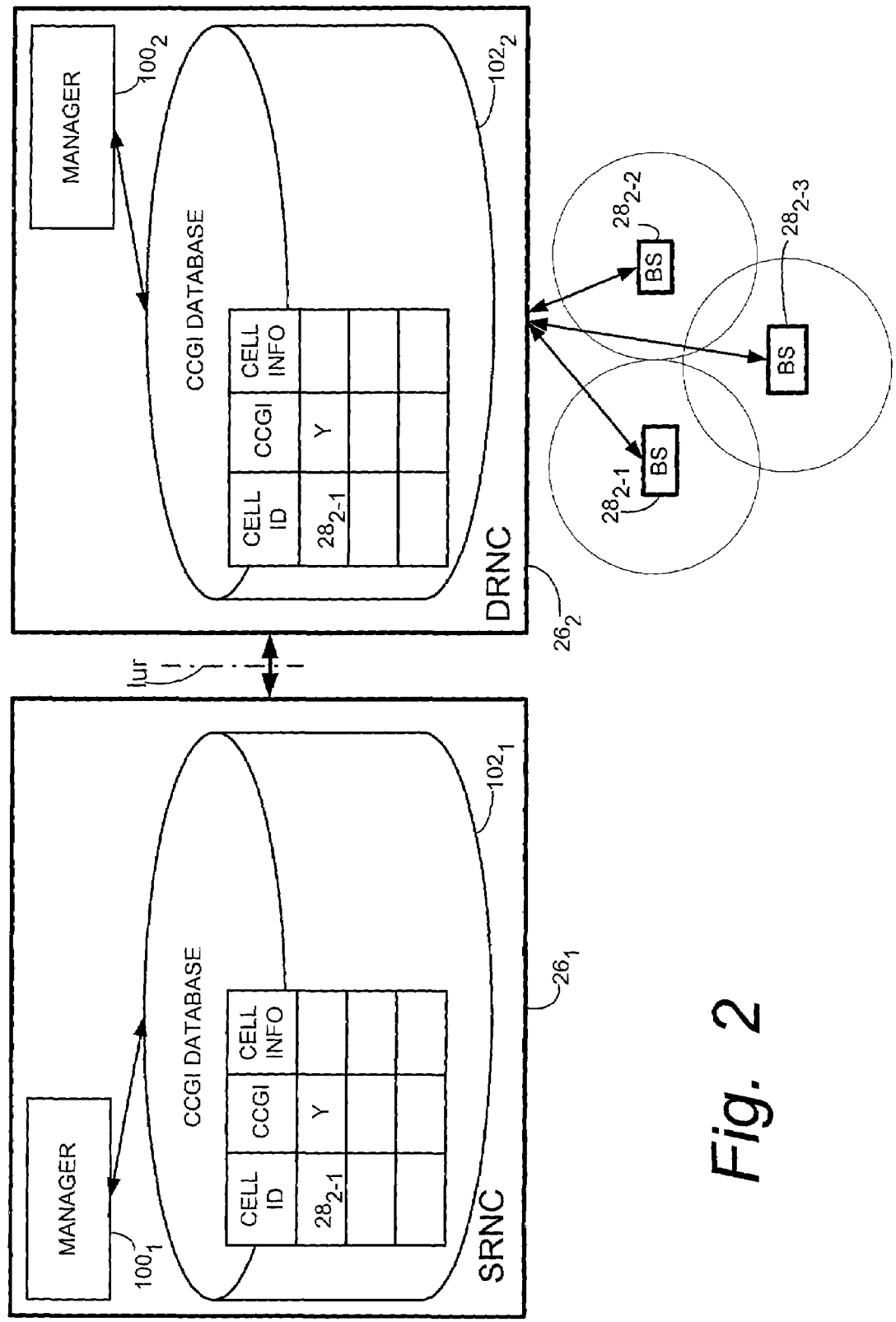
FIG. 2 is a diagrammatic view of an example embodiment showing, e.g., components of two radio network control nodes involved in the present invention.

The present invention is facilitated by a cell configuration generation index (CCGI). As explained subsequently, the cell configuration generation index (CCGI) briefly represents the cell information deemed current for a specified cell by a control node. In a generic example scenario illustrated in FIG. 2, the Serving Radio Network Control Node (SRNC) $26_1$ and the Drift Radio Network Control Node (DRNC) $26_2$ have respective controllers or managers $100_1$, $100_2$. Each of the manager 100 has access to a Cell Configuration Generation Index (CCGI) Database, hereinafter referenced as the CCGI database. For example, manager $100_1$ of SRNC $26_1$ has access to CCGI database $102_1$ and managers $100_2$ of DRNC $26_2$ has access to CCGI database $102_2$. The CCGI databases 102 can be situated, for example, at the respective control nodes 26 as shown, or otherwise situated so that information can be communicated between the manager 100 and the CCGI database 102. In the generic embodiment shown in FIG. 2, each of the CCGI databases 102 are conceptualized as a table, each row of the table pertaining to a different cell. As shown in FIG. 2, each row of the table of the CCGI databases 102 has a first field for a cell identifier (cell ID); a third field which has stored therein the cell information for the cell identified in the first field of the row; and, a second field for the cell configuration generation index (CCGI) associated with the cell information in the second field of the row.

FIG. 2 further includes a portion of the cell topography of FIG. 1, showing particularly the cells served by base stations $28_{2-1}$, $28_{2-2}$, and $28_{2-3}$, all of which are controlled by DRNC $26_2$. It should be understood that the ensuing example scenarios are not limited to the specific cell or network topography illustrated therein, but that other network and cell configurations are certainly feasible with the present invention.

Figure 2A:
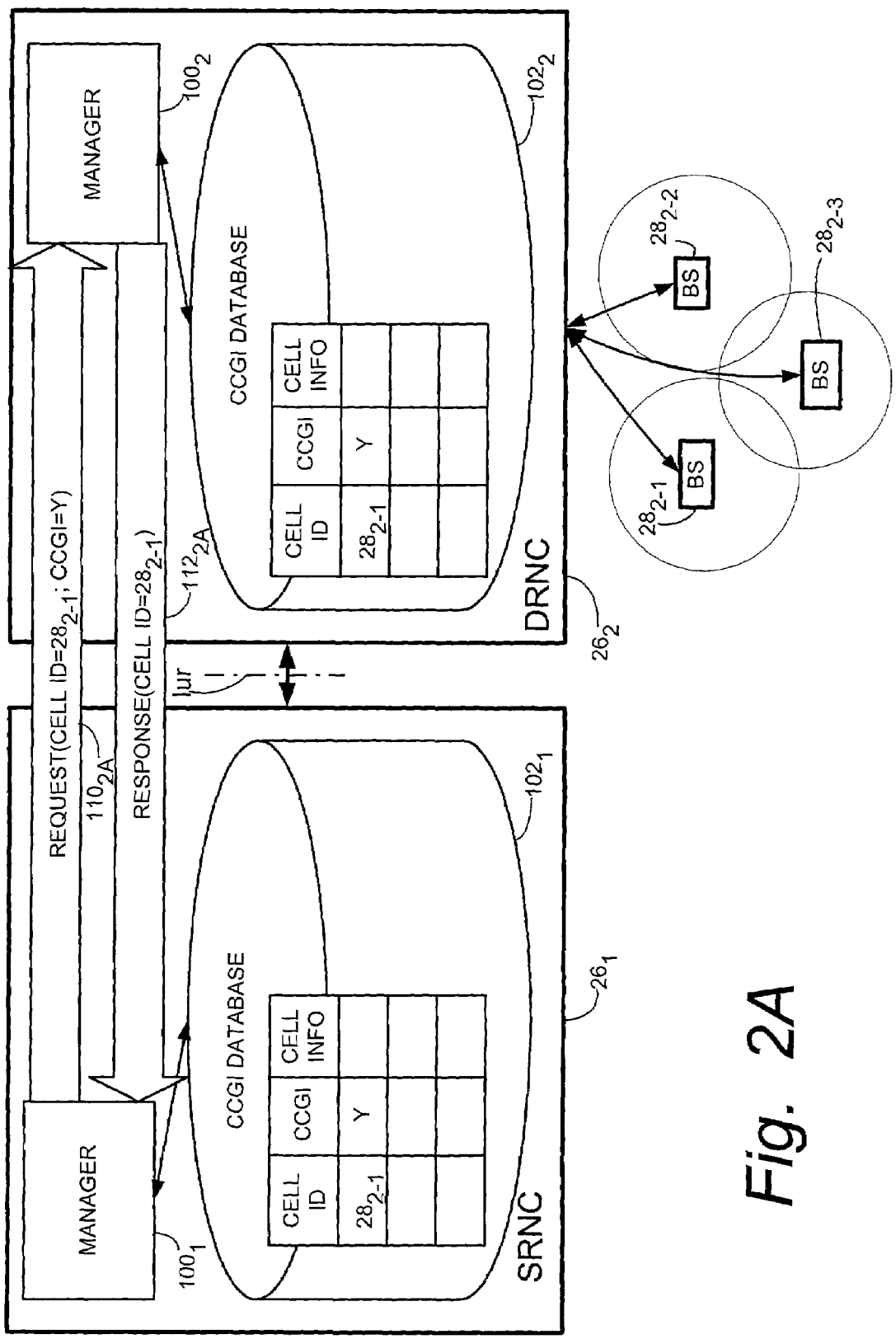
FIG. 2A–FIG. 2D are diagrammatic views showing, e.g., differing generic scenarios of message interchange between two radio network control nodes in accordance with the present invention.

FIG. 2A shows a scenario in which SRNC $26_1$ sends a request message $110_{2A}$ to DRNC $26_2$. The request message $110_{2A}$ pertains to the cell controlled by base station $28_{2-1}$, which for sake of convenience will be referenced also as cell $28_{2-1}$. At the time of sending of request message $110_{2A}$, for the cell identified as cell $28_{2-1}$ both the CCGI database $102_1$ and the CCGI database $102_2$ have the value Y for the CCGI for cell $28_{2-1}$. This means that the versions of the cell information for cell $28_{2-1}$ in the third field of the respective CCGI databases 102 are the same. The parameters included in the request message $110_{2A}$ of FIG. 2A include the cell identifier and CCGI of the cell which is the subject of request message $110_{2A}$ (i.e., cell $28_1$). Since the SRNC $26_1$ thus has the current cell information in the third field of its CCGI databases $102_1$ for cell $28_{2-1}$, the present invention permits the DRNC $26_2$ to respond with a simplified response message $112_{2A}$ as shown in FIG. 2A. In particular, the response message response message $112_{2A}$ includes the cell identifier for the cell which was the subject of request message $110_{2A}$ (i.e., cell $28_{2-1}$), but advantageously need not contain the cell information for cell $28_{2-1}$. Thus, the response message response message $112_{2A}$ means that the specified cell having the cell identifier is still a valid cell and the actual cell configuration information of the cell corresponds to the received cell configuration generation index (CCGI).

Figure 2B:
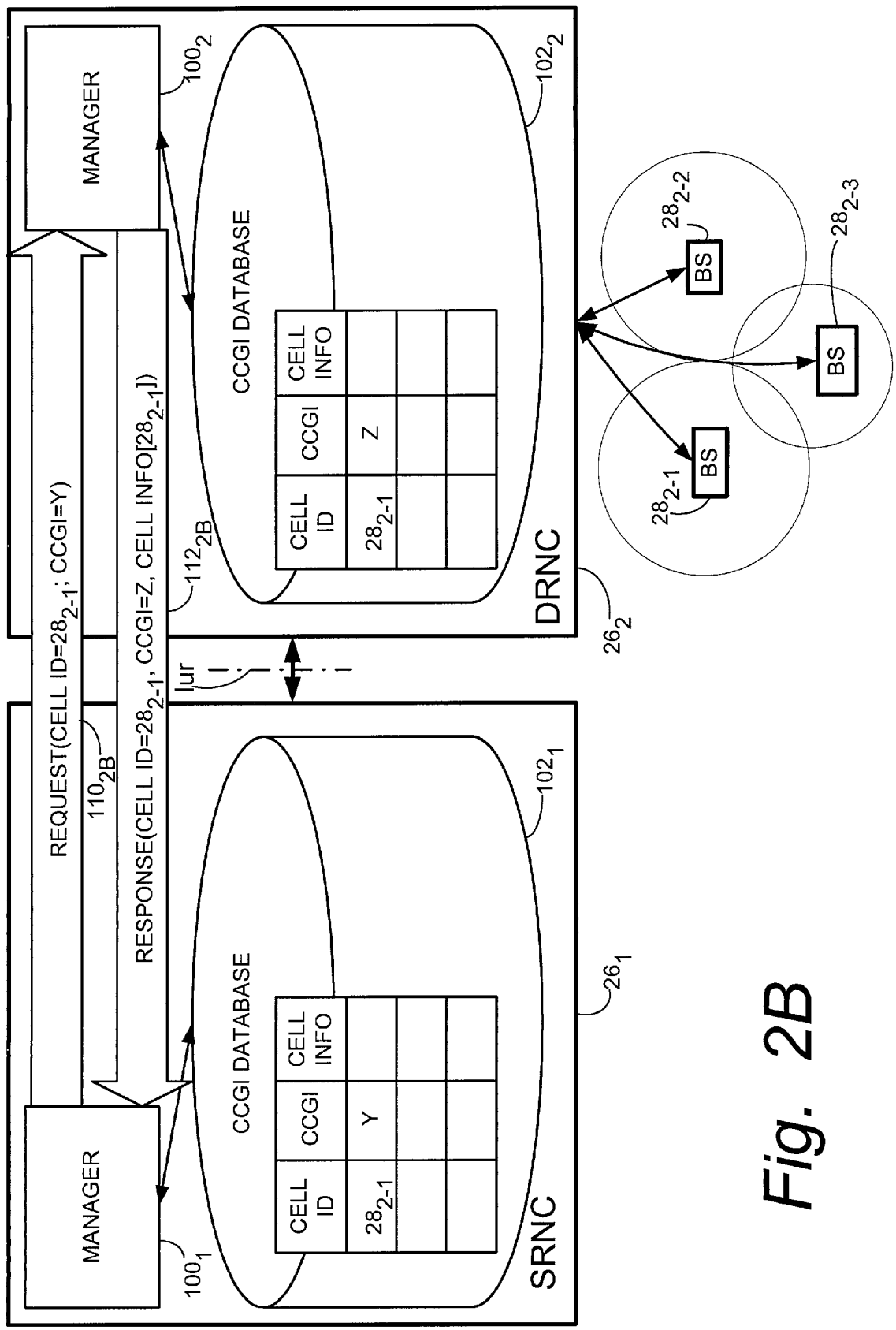

FIG. 2B shows a scenario in which the CCGI database $102_1$ of SRNC $26_1$ is not current respecting the cell information for the cell which is the subject of request message $110_{2B}$ (i.e., cell $28_{2-1}$). In the scenario shown in FIG. 2B, the actual (e.g., most current) cell information for cell $28_{2-1}$ stored in the third field of the first row of CCGI database $102_2$ in DRNC $26_2$ has the CCGI have of "Z" rather than "Y", possibly indicating an update of the cell information for cell $28_{2-1}$ since the time shown in FIG. 2A. Yet the CCGI database $102_1$ accessed by the manager $100_1$ of SRNC $26_1$ has the older version of the cell information for cell $28_{2-1}$ which is represented by the value "Y". Thus, when the manager $100_1$ of SRNC $26_1$ sends request message $110_{2B}$ to DRNC $26_2$, the request message $110_{2B}$ includes both the cell identifier $28_{2-1}$ and the CCGI=Y. Upon receipt of request message $110_{2B}$, the DRNC $26_2$ consults its CCGI database $102_2$ and determines that the CCGI database $102_1$ of SRNC $26_1$ does not have the most current version of the cell information for cell $28_{2-1}$. Accordingly, the manager $100_2$ of DRNC $26_2$ prepares and sends response message $112_{2B}$ to SRNC $26_1$. The response message $112_{2B}$ includes the cell identifier for cell $28_{2-1}$, the cell configuration generation index (CCGI) associated with and representing the cell information deemed current by DRNC $26_2$, and the cell information deemed current by DRNC $26_2$ (depicted as [CELL INFO[$28_{2-1}$] in FIG. 2B). Thus, the response message $112_{2B}$ means that the specified cell having the cell identifier is still a valid cell but the actual cell configuration information of the cell does not correspond to the received cell configuration generation index (CCGI), i.e., the cell configuration generation index (CCGI) for the specified cell has changed. The manager $100_1$ of SRNC $26_1$ can then update its entry in CCGI database $102_1$ for cell $28_{2-1}$, storing the updated cell configuration generation index (CCGI) value of Z in the second field and the current/updated cell information for cell $28_{2-1}$ in the third field.

From the foregoing it can be seen that the cell configuration generation index (CCGI) can be formed as a counter or the like. In this regard, cell configuration generation index (CCGI) can be incremented or changed in accordance with a predictable pattern when configuration data of the specified cell is changed. The evolution of values of the cell configuration generation index (CCGI) from "Y" to "Z" for cell $28_{2-1}$ as described in the transition from FIG. 2A to FIG. 2B. The use of a sequence of letters, numbers, or some other sequential set of values can be used to give the cell configuration generation index (CCGI) this counter or time stamping type of capability.

In the example scenarios generally described above with reference to FIG. 2A–FIG. 2C, a cell identifier for the specified cell and the first control node's CCGI for the specified cell are included in a request message sent from the first control node (SRNC $26_1$) to the second control node (DRNC $26_2$). If the second control node determines that the first control node's CCGI for the specified cell is current, no cell information for the specified cell need be sent by the second control node to the first control node in response. However, if the second control node determines that the first control node's CCGI for the specified cell is not current, the second control node includes in a response message both (1) the cell information deemed current by the second control node for the specified cell; and (2) second control node's CCGI (which is current and accurate) for the specified cell.

Figure 2C:
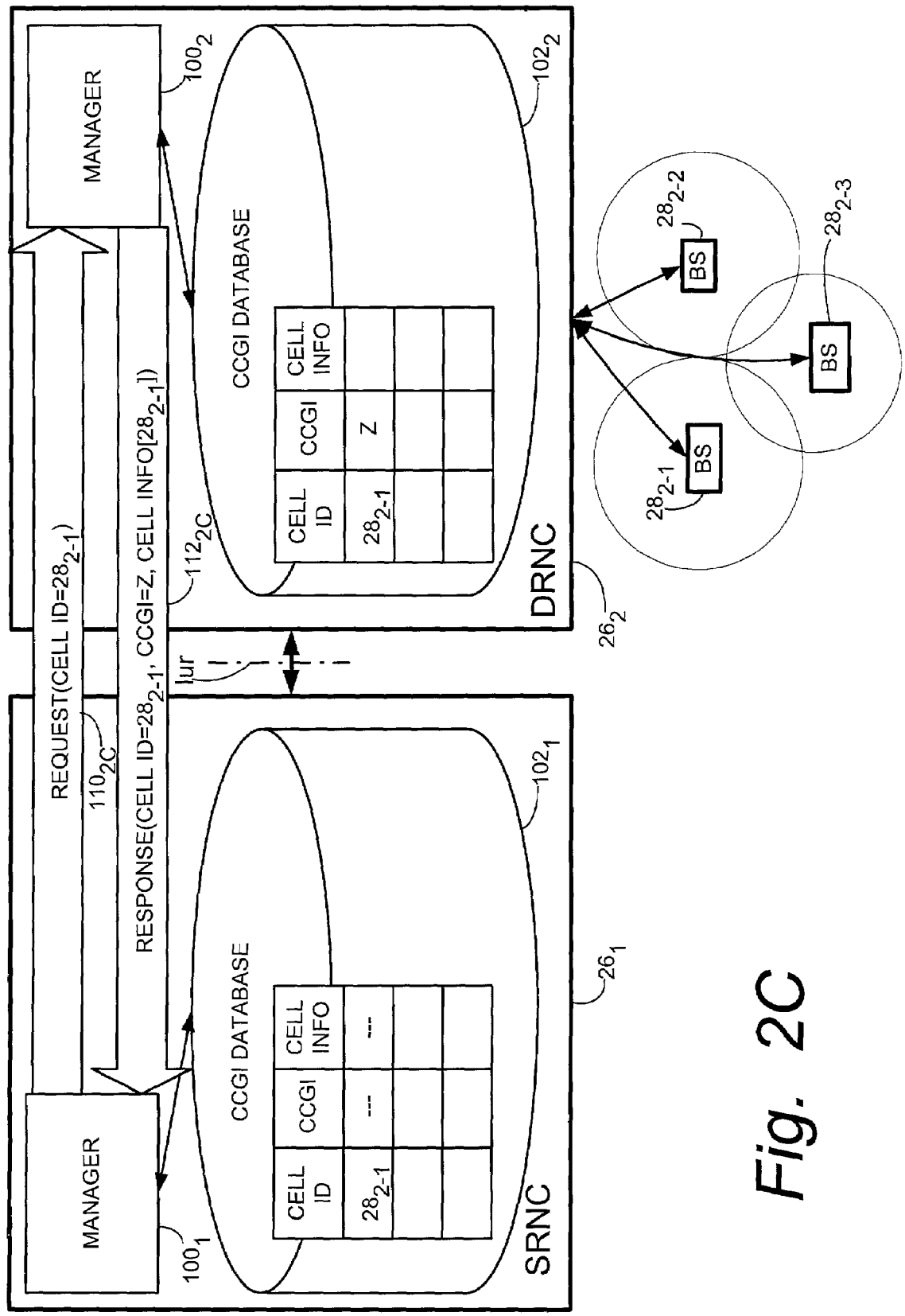

FIG. 2C shows a scenario in which the CCGI database $102_1$ of SRNC $26_1$ has no cell information for the cell which is the subject of request message $110_{2B}$ (i.e., cell $28_{2-1}$). In this scenario, the request message $110_{2C}$ prepared and transmitted by manager $100_1$ of SRNC $26_1$ to DRNC $26_2$ has the cell identifier for the subject cell (cell $28_{2-1}$), but not a CCGI value. Therefore, upon receipt the manager $100_2$ of DRNC $26_2$ recognizes that the CCGI database $102_1$ of SRNC $26_1$ does not have cell information for cell $28_{2-1}$, and accordingly prepares its response message $112_{2C}$. The response message $112_{2C}$ of the FIG. 2C scenario is essentially the same as for the FIG. 2B scenario, including the cell identifier for cell $28_{2-1}$, the cell configuration generation index (CCGI) associated with and representing the cell information deemed current by DRNC $26_2$, and the cell information deemed current by DRNC $26_2$ (depicted as [CELL INFO $[28_{2-1}]$ in FIG. 2C). The manager $100_1$ of SRNC $26_1$ can then store an entry in CCGI database $102_1$ for cell $28_{2-1}$, storing the updated cell configuration generation index (CCGI) value of Z in the second field and the current/updated cell information for cell $28_{2-1}$ in the third field.

Thus, in the example scenario of FIG. 2C, if the request message sent from the first control node to the second control node contains only a cell identifier for the specified cell and not a CCGI for the specified cell, a response message sent from the second control node to the first control node includes both (1) the cell information deemed current by the second control node for the specified cell; and (2) second control node's CCGI (which is current and accurate) for the specified cell.

Figure 2D:
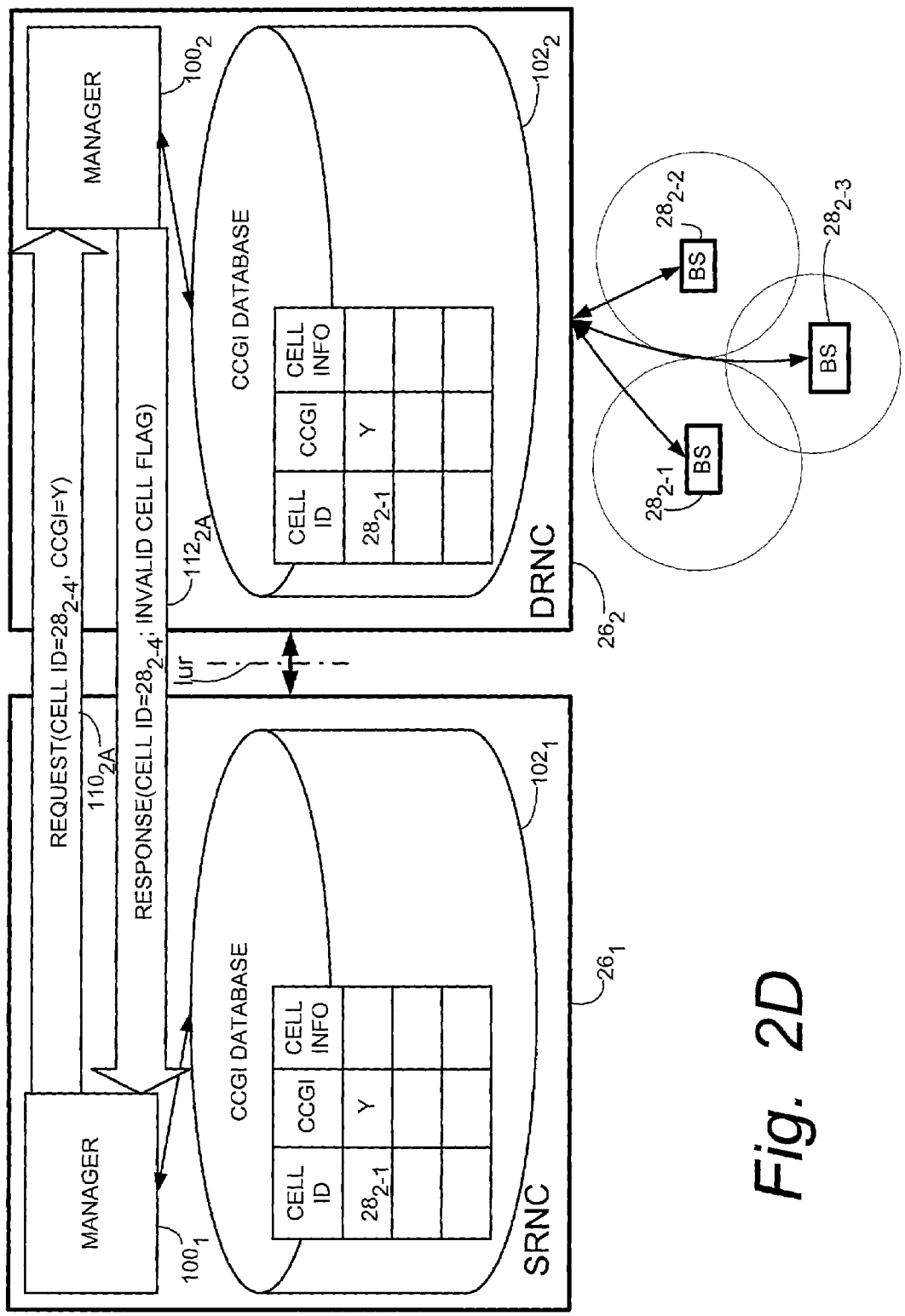

It can turn out that the SRNC $26_1$ issues a request message which includes a cell identifier for a cell unknown to DRNC $26_2$. This potential scenario is illustrated in FIG. 2D, wherein the request message $110_{2D}$ includes a cell identifier for cell $28_{2-4}$. Given the particular network topology shown in FIG. 2D, there is no cell $28_{2-4}$ controlled by DRNC $26_2$. Accordingly, DRNC $26_2$ prepares and transmits to SRNC $26_1$ a response message $112_{2D}$ which includes an indication that the specified cell (i.e., cell $28_{2-4}$) is invalid.

Figure 3:
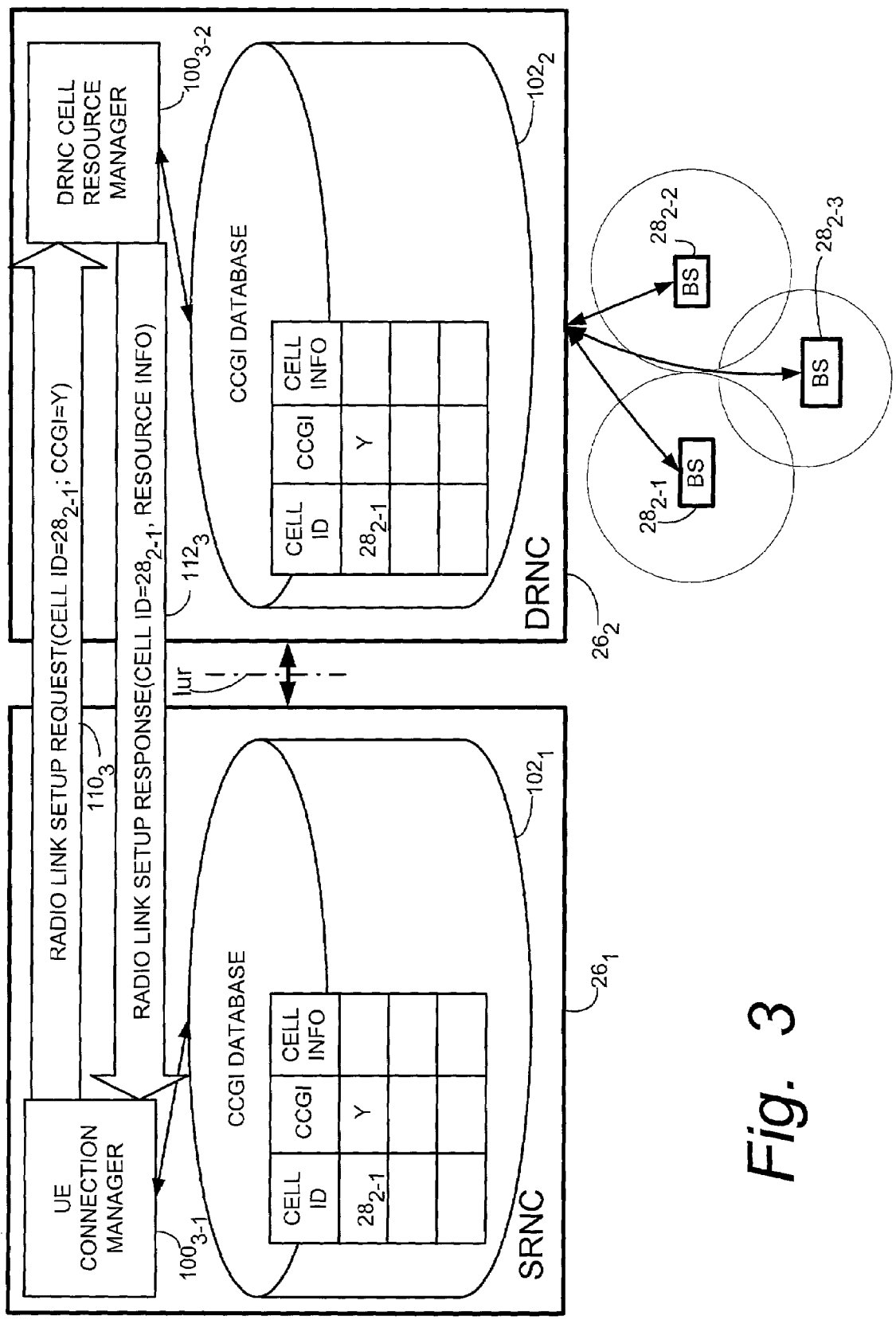
FIG. 3 is diagrammatic view showing, e.g., messages involved in the scenarios of FIG. 2A–FIG. 2D taking the form of messages involved in a radio link setup procedure.

The request message sent from a SRNC such as SRNC $26_1$ to a DRNC such as DRNC $26_2$ (such as the request messages $110_{2A}$, $110_{2B}$, and $110_{2C}$ of FIG. 2A–FIG. 2C, respectively) can take various forms, several examples of which are hereinafter briefly discussed. FIG. 3 shows a situation in which the request message is a radio link setup request message $110_3$. A radio link setup request message $110_3$ is employed in circumstances such as that shown in FIG. 1C when for the first time a radio link is to be established by the SRNC in a cell controlled by the DRNC. A purpose of the radio link setup request message is to request the DRNC to allocate radio link resources in the new cell for the user equipment unit (UE) whose connection is controlled by the SRNC. In this context, the manager $100_1$ of SRNC $26_1$ takes the form of UE connection manager $100_{3-1}$, while the manager $100_2$ of DRNC $26_2$ takes the form of DRNC cell resource manager $100_{3-2}$. The particular situation shown in FIG. 3 happens to correspond to the example scenario of FIG. 2A, in which the CCGI database $102_1$ of SRNC $26_1$ has the most current cell information for cell $28_{2-1}$ (i.e., has the same cell information for cell $28_{2-1}$ as does CCGI database $102_2$). In such event, the response message $112_3$ (known as the radio link setup response message) need not include the cell information for cell $28_{2-1}$, but rather includes the cell identifier for cell $28_{2-1}$. Moreover, since the scenario of FIG. 3 concerns a radio link setup procedure, the response message $112_3$ includes information regarding the resources allocated by DRNC $26_2$ (depicted as "RESOURCE INFO" in FIG. 3) Such resources can include, for example, the DL codes (one or more pairs of DL channelization code and scrambling code), among other items. Of course, the manifestation of the request message as a radio link setup need not follow the example scenario of FIG. 2A, but could instead follow other scenarios such as the scenarios of one of FIG. 2B–FIG. 2D, for example.

Figure 4:
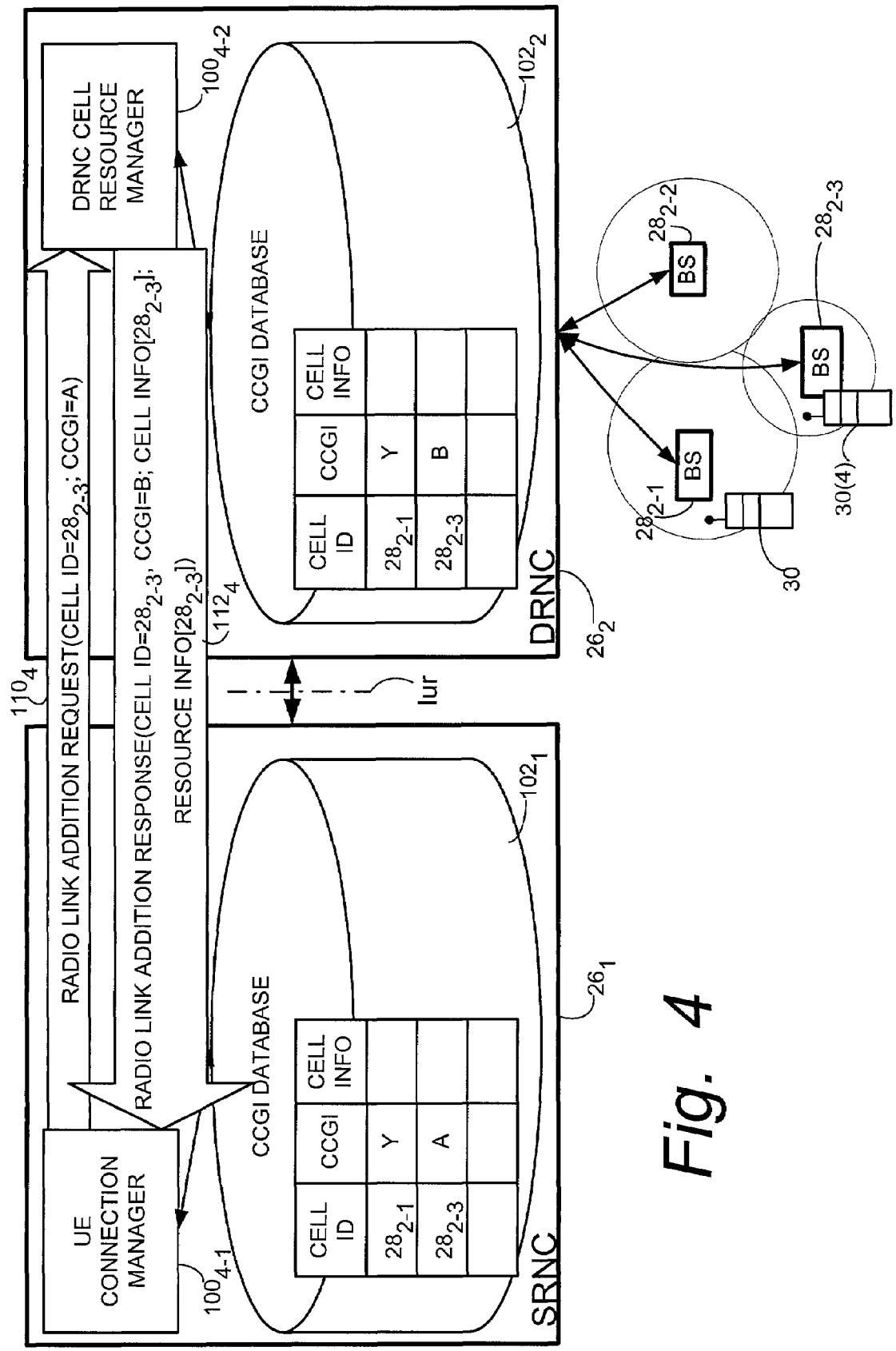
FIG. 4 is diagrammatic view showing, e.g., messages involved in the scenarios of FIG. 2A–FIG. 2D taking the form of messages involved in a radio link addition procedure.

The scenario of FIG. 4 resembles that of FIG. 3, but differs in that the request message takes the form of a radio link addition request message $110_4$ rather than a radio link setup request message. A radio link addition request message, which starts a radio link addition procedure, is employed when the SRNC desires to establish another leg of a connection with a user equipment unit (UE) in a cell controlled by the DRNC, the SRNC already having a least one radio link controlled by the DRNC extant (e.g., at least one radio link using resources in a cell controlled by the DRNC already exists). This is illustrated in FIG. 4 by inclusion of user equipment unit (UE) 30(4), which is moving into cell $28_{2-3}$ subsequent to the establishment of a connection leg with user equipment unit (UE) 30 via cell $28_{2-1}$. Therefore, concerning user equipment unit (UE) 30(4), the cell which is the subject of the radio link addition request message $110_4$ is cell $28_{2-3}$. The situation shown in FIG. 4 corresponds more closely to that of the general case of FIG. 2B in which the CCGI database $102_1$ of SRNC $26_1$ does not have an updated version of the cell information for cell $28_{2-3}$. This is reflected by the fact that the value of cell configuration generation index (CCGI) for cell $28_{2-3}$ as stored in the CCGI database $102_1$ and included in the radio link addition request message $110_4$ has the value "A", rather than the updated value of "B" as stored in the CCGI database $102_2$. Accordingly, the radio link addition response message $112_3$ of FIG. 4 includes, in addition to the list of resources allocated for the added connection leg, the cell identifier for cell $28_{2-3}$, the cell configuration generation index (CCGI) associated with and representing the cell information deemed current by DRNC $26_2$, and the cell information deemed current by DRNC $26_2$ (depicted as [CELL INFO $[28_{2-3}]$ in FIG. 4). The UE connection manager $100_4$ of SRNC $26_1$ can then update its entry in CCGI database $102_1$ for cell $28_{2-3}$, storing the updated cell configuration generation index (CCGI) value of B in the second field and the current/updated cell information for cell $28_{2-3}$ in the third field. Of course, as mentioned above, a radio link addition response message can follow any of the scenarios above described in addition to the example scenario of FIG. 2B, such as the scenarios of FIG. 2A or FIG. 2C, for example.

Figure 5:
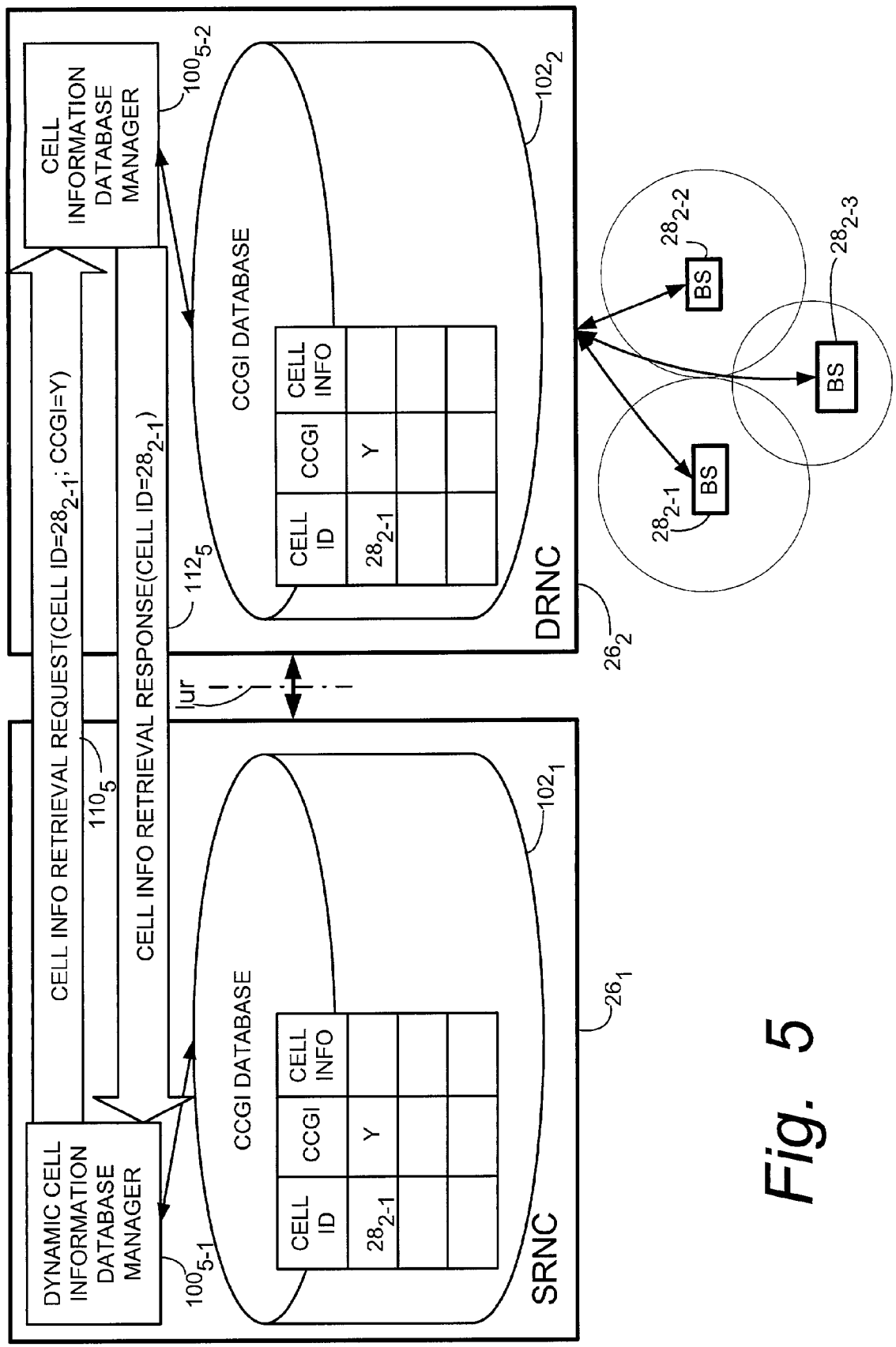
FIG. 5 is diagrammatic view showing, e.g., messages involved in the scenarios of FIG. 2A–FIG. 2D taking the form of messages involved in a cell information retrieval procedure.

FIG. 5 shows the generic request message request message taking the form of a cell information retrieval request message $110_5$. In this context, the manager $100_1$ of SRNC $26_1$ takes the form of dynamic cell info database manager $100_{5-1}$, while the manager $100_2$ of DRNC $26_2$ takes the form of cell info database manager $100_{5-2}$. The scenario of FIG. 5 permits a RNC such as a SRNC to retrieve cell information for a certain cell in another RNC (e.g., a DRNC) without requesting any resources in the cell.

Thus, as illustrated by FIG. 3 and FIG. 4, respectively, the response message can be of the nature of a radio link setup response message or a radio link addition response message. The request and response messages of the present invention are not, however, limited to or necessarily confined to resource allocation, as the request message can instead take the form of a status or update request or the like for ascertaining the actual current cell information for the specified cell in the example manner of FIG. 5.

In example modes of the invention described above, the cell information includes a set of cell information parameters characterizing the specified cell served by a base station controlled by the second control node. In other modes of the invention described in more detail below, the cell information can additionally or optionally include a set of cell information parameters which characterizes at least one cell which neighbors the specified cell. Preferably, the cell information includes a set of cell information parameters for all of the cells which neighbor the specified cell.

Figure 6:
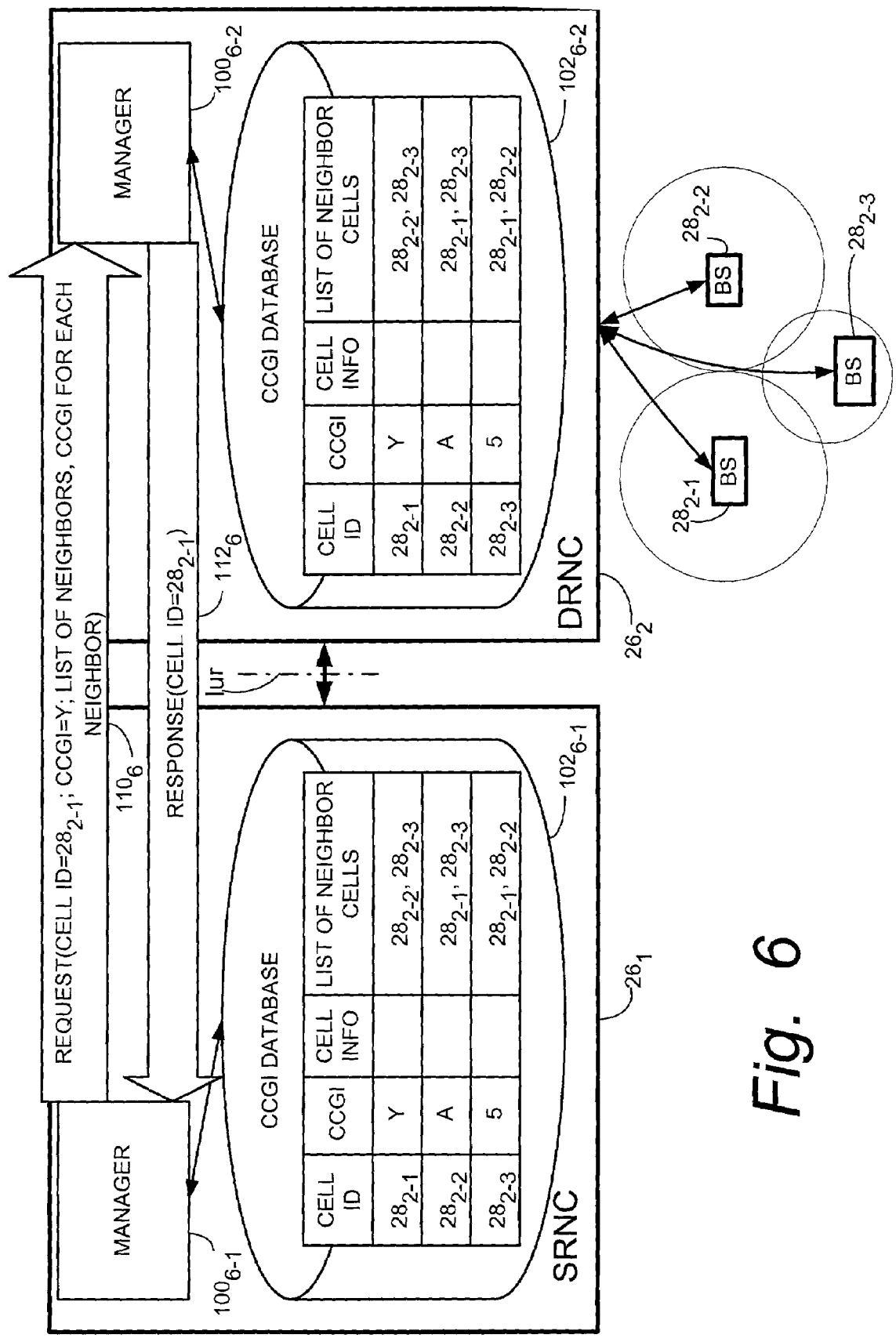
FIG. 6, FIG. 6A(1), FIG. 6A(2), FIG. 6B(1), FIG. 6B(2), and FIG. 6C are diagrammatic views showing messages involved with a neighboring cell mode of the present invention.

FIG. 6 shows a scenario in which the request message $110_6$ includes, in addition to the cell identifier and cell configuration generation index (CCGI) for a specified cell (e.g., cell $28_{2-1}$), a list of neighboring cells for the specified cell. In the embodiment shown in FIG. 6, the CCGI databases $102_{6-1}$ and $102_{6-2}$ additionally maintain, for each cell entered in the database, a list of neighboring cells (shown as the fourth field in each row of the databases). The master or most current list of neighboring cells controlled by DRNC $26_2$ is maintained by the CCGI database $102_{6-2}$. In the context of the illustration of FIG. 6, cell $28_{2-1}$ has cell $28_{2-2}$ and cell $28_{2-3}$ as neighboring cells which are controlled by DRNC $26_2$. In preparing the request message $110_6$, the list of neighboring cells for the specified cell is taken from a fourth field for the row of cell $28_{2-1}$ in the CCGI database $102_{6-1}$. The manager $100_6$ of the SRNC $26_1$ further searches the CCGI database $102_{6-1}$ to obtain, for each of the neighboring cells listed in the fourth field, a cell configuration generation index (CCGI) value for such neighboring cells for inclusion in the request message $110_6$.

In the particular situation shown in FIG. 6, the cell information contained in CCGI database $102_{6-1}$ for the specified cell (i.e., cell $28_{2-1}$) and each of its neighboring cells is current. Therefore, in accordance with the general scenario of FIG. 2A, the response message $112_6$ returned by the DRNC $26_2$ need not include any cell information for any cell. Rather, the response message $112_6$ returned by the DRNC $26_2$ bears the cell identifier for the specified cell.

FIG. 6A(1) shows a situation, akin to that of FIG. 2B, in which the cell information contained in CCGI database $102_{6-1}$ for the specified cell $28_{2-1}$ is incorrect. Particularly, CCGI database $102_6$ contains an out-dated version of cell information for cell $28_{2-1}$ as represented by CCGI=Y, whereas the CCGI database $102_{6-2}$ maintained by DRNC $26_2$ has cell information for cell $28_{2-1}$ represented by CCGI=Z. However, the cell information maintained for the cells which are neighboring cells of cell $28_{2-1}$ (e.g., cell $28_{2-2}$ and cell $28_{2-3}$ are current). Accordingly, in the FIG. 6A(1) scenario, the response message $112_{6A}(I)$ includes the cell identifier for cell $28_{2-1}$, the cell configuration generation index (CCGI) associated with and representing the cell information deemed current by DRNC $26_2$, and the cell information deemed current by DRNC $26_2$ (depicted as [CELL INFO[$28_{2-1}$] in FIG. 6A(1)). No cell information for the neighboring cells need be included in the response message $112_{6A(1)}$. The manager $100_{6-2}$ of SRNC $26_1$ can then update its entry in CCGI database $102_{6-1}$ for cell $28_{2-1}$, storing the updated cell configuration generation index (CCGI) value of Z in the second field and the current/updated cell information for cell $28_{2-1}$ in the third field.

FIG. 6A(2) shows a situation in which the cell information contained in CCGI database $102_{6-1}$ for the specified cell $28_{2-1}$ is correct, but the cell information for cell $28_{2-2}$ is not current. The response message $112_{6A}(2)$ includes the cell identifier for the cell for which CCGI database $102_{6-1}$ needs updating (e.g., cell $28_{2-2}$); the cell configuration generation index (CCGI) associated with and representing the cell information deemed current by DRNC $26_2$ for cell $28_{2-2}$; and, the cell information deemed current by DRNC $26_2$ for cell $28_{2-2}$ (depicted as [CELL INFO[$28_{2-2}$] in FIG. 6A(2)). The manager $100_{6-2}$ of SRNC $26_1$ can then update its entry in CCGI database $102_{6-1}$ for cell $28_{2-2}$, storing the updated cell configuration generation index (CCGI) value of B in the second field and the current/updated cell information for cell $28_{2-2}$ in the third field.

A response message having a format such as the response message $112_{6A(2)}$ of the FIG. 6A(2) signifies that the cell $28_{2-2}$ is still a valid neighboring cell, but that the actual configuration does not correspond to the cell configuration generation index (CCGI) received in the request message. This could mean either: (1) the cell configuration generation index (CCGI) has changed for the neighboring cell (in the case that the cell identifier is included in the request, or (2) the cell is a new neighboring cell (in the case that the cell identifier is not included in the request).

From the foregoing it can be understood that other scenarios are also encompassed within the present invention, such as a scenario in which the response message must include current cell information and corresponding cell configuration generation index (CCGI) values for plural neighboring cells, or a scenario in which the response message must include current cell information and corresponding cell configuration generation index (CCGI) values for both the specified cell and one or more neighboring cells.

FIG. 6B(1) shows a scenario in which the a request message $110_{6B}$ includes an incomplete list of neighboring cells. In the FIG. 6B(1) scenario, the CCGI database $102_{6-1}$ SRNC 261 does not yet know that cell $28_{2-3}$ is a neighboring cell for cell $28_{2-1}$. The request message $110_{6B(1)}$ of FIG. 6B(1) therefore includes an incomplete list of neighboring cells. Upon receipt, the manager $100_2$ of DRNC $26_2$ notes the incomplete list of neighboring cells in the request message $110_{6B(1)}$, and accordingly prepares a response message $112_{6B(1)}$ for the request message $110_{6B(1)}$ that concerned specified cell $28_{2-1}$. The response message $112_{6B(1)}$ includes a cell identifier for the cell $28_{2-3}$ (the cell whose neighboring status was unknown to SRNC $26_1$); as well as the cell information deemed current by DRNC $26_2$ for cell $28_{2-3}$ and the cell configuration generation index (CCGI) representative thereof (CCGI=5).

FIG. 6B(2) shows a situation more egregious than that of FIG. 6B(1), in which the CCGI database $102_{6-1}$ SRNC $26_1$ does not know any of the neighbors for cell $28_{2-1}$. In a manner understood from FIG. 6B(1) and the foregoing explanation thereof, the response message $112_{6B(2)}$ of FIG. 6B(2) supplies the CCGI database $102_{6-1}$ of FIG. 6B(2) with the cell information and cell configuration generation indices (CCGI) for all cells controlled by DRNC $26_2$ which neighbor cell $28_{2-1}$. In essence, this amounts to the DRNC $26_2$ providing a list of known neighboring cells and cell information for those neighboring cells to the SRNC $26_1$.

Figure 6C:
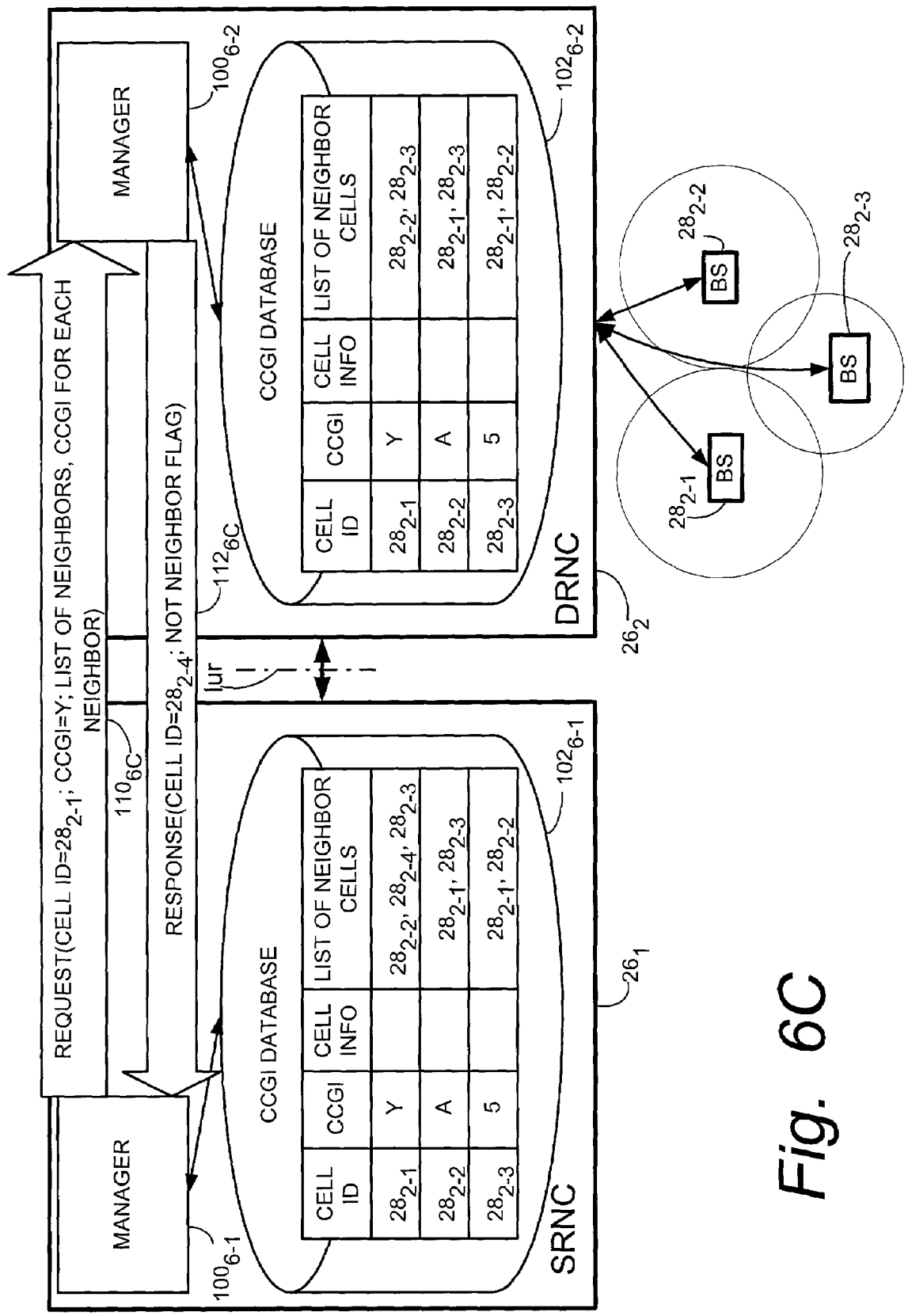

FIG. 6C shows a situation in which the CCGI database $102_{6-1}$ SRNC $26_1$ incorrectly assumes that cell $28_{2-4}$ is a neighboring cell for cell $28_{2-1}$. In such case, the response message $112_{6C}$ includes a cell identifier for the cell erroneously deemed by SRNC $26_1$ to be a neighbor (e.g., a cell identifier for cell $28_{2-4}$), and an indication that such cell is not a neighbor cell (e.g., a NOT NEIGHBOR FLAG).

For the scenarios of FIG. 6, FIG. 6A(1), FIG. 6A(2), FIG. 6B(1), FIG. 6B(2), and FIG. 6C, the response messages can optionally include cell identifiers of the valid cells for which no updating or addition is required (as, e.g., a confirmation that those cells are still valid and that the cell information therefor as stored at the SRNC $26_1$ is still viable [e.g., current]). Moreover, for any of the scenarios of FIG. 6, FIG. 6A(1), FIG. 6A(2), FIG. 6B(1), FIG. 6B(2), and FIG. 6C, the request messages can take the form of any one of the example messages previously described, such as (for example) a radio link setup request message, a radio link addition request message; a cell information retrieval request message, etc.

In conjunction with the foregoing, a radio access network can have a radio network controller having access to a cell configuration generation index (CCGI) for each cell controlled thereby and that is defined as a neighboring cell to any other cell in the radio access network. The cell configuration generation index (CCGI) thus, in one of its aspects, represents a set of cell configuration parameters to be communicated between radio network control nodes.

The scenarios and procedures described above can be used for various purposes. For example, the scenario of FIG. 5 with its cell information retrieval procedure can be used (but need not be exclusively used) for configuration information needed for positioning purposes (e.g., when determining the position of a user equipment unit (UE)). The scenarios described above are merely non-limiting examples and are not intended to be exhaustive. It should further be understood that for many of the messages described herein that other parameters can be included; the illustrated parameters are those pertinent to the present invention but not necessarily comprehensive of types of parameters that may be included for other purposes.

As apparent from the foregoing, cell information for a specific cell need be transmitted over the Iur interface only when changed. Advantageously, the present invention reduces data volumes transferred between control nodes of a radio access network (e.g., between SRNC $26_1$ and DRNC $26_2$) on such occasions as, for example, establishing resources in a cell controlled by the DRNC $26_2$. The invention therefore also beneficially reduces signaling delay between the radio network control nodes.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. For use in a radio access network having a first control node which controls a first set of base stations and a second control node which controls a second set of base stations, each base station serving a cell, a method comprising:
   transmitting cell information from the second control node to the first control node only when the cell information is not already known by the first control node, the cell information including a set of cell information parameters characterizing a specified cell served by a base station controlled by the second control node;
   sending a request message from the first control node to the second control node, the request message including a cell identifier for the specified cell;
   sending a response message from the second control node to the first control node;
   including in the response message both (1) the cell information deemed current by the second control node for the specified cell; and (2) an index which is representative of the cell information deemed current by the second control node for the specified cell; and
   wherein the index is of a shorter length than the cell information.

2. The method of claim 1, further comprising:
   determining from a cell identifier for the specified cell whether the specified cell is a valid cell; and
   further comprising including in the response message an indication that the specified cell is not a valid cell.

3. The method of claim 1, wherein the request message requests that the second control node allocate resources in the specified cell for a connection controlled by the first control node.

4. The method of claim 3, wherein the request message is one of a radio link setup request message and a radio link addition request message.

5. For use in a radio access network having a first control node which controls a first set of base stations and a second control node which controls a second set of base stations, each base station serving a cell, a method comprising:
   transmitting cell information from the second control node to the first control node only when the cell information is not already known by the first control node, the cell information including a set of cell information parameters characterizing a specified cell served by a base station controlled by the second control node;
   sending a request message from the first control node to the second control node, the request message including a cell identifier for the specified cell;
   sending a response message from the second control node to the first control node;
   including in the response message both (1) the cell information deemed current by the second control node for the specified cell; and (2) an index which is representative of the cell information deemed current by the second control node for the specified cell; and
   forming the index as a counter whose value is changed when configuration data of the specified cell is changed.

6. The method of claim 5, further comprising:
   determining from a cell identifier for the specified cell whether the specified cell is a valid cell; and
   further comprising including in the response message an indication that the specified cell is not a valid cell.

7. The method of claim 5, wherein the request message requests that the second control node allocate resources in the specified cell for a connection controlled by the first control node.

8. For use in a radio access network having a first control node which controls a first set of base stations and a second control node which controls a second set of base stations, each base station serving a cell, a method comprising:
   transmitting cell information from the second control node to the first control node only when the cell information is not already known by the first control node, the cell information including a set of cell information parameters characterizing a specific cell served by a base station controlled by the second control node;
   sending a request message from the first control node to the second control node;
   including in the request message an index which is representative of the cell information deemed current by the first control node for the specified cell; and
   wherein the index is of a shorter length than the cell information.

9. The method of claim 8, further comprising:
   (1) determining whether the index included in the request message represents cell information which is deemed current by the second control node;
   (2) sending a response message from the second control node to the first control node; and
   (3) if the determination of step (1) is negative, including in the response message the cell information deemed current by the second control node for the specified cell.

10. The method of claim 9, further comprising including in the response message an index which is representative of the cell information deemed current by the second control node for the specified cell.

11. The method of claim 8, further comprising:
determining from a cell identifier for the specified cell whether the specified cell is a valid cell;
sending a response message from the second control node to the first control node; and
further comprising including in the response message an indication that the specified cell is not a valid cell.

12. The method of claim 8, wherein the request message requests that the second control node allocate resources in the specified cell for a connection controlled by the first control node.

13. For use in a radio access network having a first control node which controls a first set of base stations and a second control node which controls a second set of base stations, each base station serving a cell, a method comprising:
transmitting cell information from the second control node to the first control node only when the cell information is not already known by the first control node, the cell information including a set of cell information parameters characterizing a specific cell served by a base station controlled by the second control node;
sending a request message from the first control node to the second control node;
including in the request message an index which is representative of the cell information deemed current by the first control node for the specified cell; and
forming the index as a counter whose value is changed when configuration data of the specified cell is changed.

14. The method of claim 13, further comprising:
(1) determining whether the index included in the request message represents cell information which is deemed current by the second control node;
(2) sending a response message from the second control node to the first control node; and
(3) if the determination of step (1) is negative, including in the response message the cell information deemed current by the second control node for the specified cell.

15. The method of claim 13, further comprising:
determining from a cell identifier for the specified cell whether the specific cell is a valid cell;
sending a response message from the second control node to the first control node; and
further comprising including in the response message an indication that the specified cell is not a valid cell.

16. The method of claim 13, wherein the request message requests that the second control node allocate resources in the specified cell for a connection controlled by the first control node.

17. For use in a radio access network having a first control node which controls a first set of base stations and a second control node which controls a second set of base stations, each base station serving a cell, a method comprising transmitting cell information from the second control node to the first control node only when the cell information is not already known by the first control node, the cell information including a set of cell information parameters characterizing a specified cell served by a base station controlled by the second control node;
wherein the cell information includes a set of cell information parameters which characterizes the specified cell and a set of cell information parameters which characterizes at least one neighboring cell, the neighboring cell being adjacent to the specified cell.

18. The method of claim 17, further comprising:
sending a request message from the first control node to the second control node; and
including in the request message an index which is representative of the cell information deemed current by the first control node for the specified cell and a neighbor index which is representative of the cell information deemed current by the first control node for the neighboring cell.

19. The method of claim 18, wherein the neighbor index is of a shorter length than the cell information for the neighboring cell.

20. The method of claim 18, further comprising forming the neighbor index as a counter whose value is changed when configuration data of the neighboring cell is changed.

21. The method of claim 18, further comprising:
(1) determining whether the index included in the request message represents cell information which is deemed current by the second control node;
(2) determining whether the neighbor index included in the request message represents cell information which is deemed current by the second control node to the neighboring cell;
(3) sending a response message from the second control node to the first control node;
(4) if the determination of step (1) is negative, including in the response message the cell information deemed current by the second control node for the specified cell,
(5) if the determination of step (2) is negative, including in the response message the cell information deemed current by the second control node for the neighboring cell.

22. The method of claim 21, further comprising including in the response message a neighboring index which is representative of the cell information deemed current by the second control node for the neighboring cell.

23. The method of claim 18, further comprising:
determining from a cell identifier for the neighboring cell whether the neighboring cell is a valid cell;
sending a response message from the second control node to the first control node; and
further comprising including in the response message an indication that the neighboring cell is not a valid cell.

24. The method of claim 18, wherein the request message requests that the second control node allocate resources in the specified cell for a connection controlled by the first control node.

25. The method of claim 24, wherein the request message is one of a radio link setup request message and a radio link addition request message.

26. A telecommunications network comprising:
a radio access network having a first control node and a second control node, each of the first control node and the second control node controlling at least one base station;
a signaling link connecting the first control node and the second control node;
wherein the second control node transmits cell information from the second control node to the first control node over the signaling link only when the cell information is not already known by the first control node, the cell information including a set of cell information parameters characterizing a specified cell served by a base station controlled by the second control node;

wherein the first control node sends a request message to the second control node, the request message including a cell identifier for the specific cell, and wherein the second control node sends a response message to the first control node, the response message including both (1) the cell information deemed current by the second control node for the specified cell; and (2) an index which is representative of the cell information deemed current by the second control node for the specified cell; and wherein the index is of a shorter length than the cell information.

27. The apparatus of claim 26, wherein the second control node determines from a cell identifier for the specified cell whether the specified cell is a valid cell and sends a response message from the second control node to the first control node; including in the response message an indication that the specified cell is not a valid cell.

28. The apparatus of claim 26, wherein the request message requests that the second control node allocate resources in the specified cell for a connection controlled by the first control node.

29. The apparatus of claim 28, wherein the request message is one of a radio link setup request message and a radio link addition request message.

30. The apparatus of claim 26, wherein the first control node and the second control node are both radio network control nodes.

31. The apparatus of claim 30, wherein the first control node is a Serving Radio Network Control (SRNC) node and the second control node is a Drift Radio Network Control (DRNC).

32. A telecommunications network comprising:
a radio access network having a first control node and a second control node, each of the first control node and the second control node controlling at least one base station;
a signaling link connecting the first control node and the second control node;
wherein the second control node transmits cell information from the second control node to the first control node over the signaling link only when the cell information is not already known by the first control node, the cell information including a set of cell information parameters characterizing a specified cell served by a base station controlled by the second control node;
wherein the first control node sends a request message to the second control node, the request message including a cell identifier for the specified cell, and wherein the second control node sends a response message to the first control node, the response message including both (1) the cell information deemed current by the second control node for the specified cell; and (2) an index which is representative of the cell information deemed current by the second control node for the specified cell; and
wherein the index is a counter whose value is changed when configuration data of the specified cell is changed.

33. The apparatus of claim 32, wherein the second control node determines from a cell identifier for the specified cell whether the specified cell is a valid cell and sends a response message from the second control node to the first control node;
including in the response message an indication that the specified cell is not a valid cell.

34. The apparatus of claim 32, wherein the request message requests that the second control node allocate resources in the specified cell for a connection controlled by the first control node.

35. The apparatus of claim 32, wherein the first control node and the second control node are both radio network control nodes.

36. The apparatus of claim 35, wherein the first control node is a Serving Radio Network Control (SRNC) node and the second control node is a Drift Radio Network Control (DRNC).

37. A telecommunications network comprising:
a radio access network having a first control node and a second control node, each of the first control node and the second control node controlling at least one base station;
a signaling link connecting the first control node and the second control node;
wherein the second control node transmits cell information from the second control node to the first control node over the signaling link only when the cell information is not already known by the first control node, the cell information including a set of cell information parameters characterizing a specified cell served by a base station controlled by the second control node;
wherein the first control node sends a request message to the second control node and includes in the request message an index which is representative of the cell information deemed current by the first control node for the specified cell; and
wherein the index is of a shorter length than the cell information.

38. The apparatus of claim 37, wherein the second control node determines whether the index included in the request message represents cell information which is deemed current by the second control node and, in the event of a negative determination, includes in a response message sent to the first control node the cell information deemed current by the second control node for the specified cell.

39. The apparatus of claim 37, wherein the second control node determines from a cell identifier for the specified cell whether the specified cell is a valid cell, in the event of an affirmative determination, includes in a response message sent to the first control cell an indication that the specified cell is not a valid cell.

40. The apparatus of claim 37, wherein the request message requests that the second control node allocate resources in the specified cell for a connection controlled by the first control node.

41. The apparatus of claim 40, wherein the request message is one of a radio link setup request message and a radio link addition request message.

42. A telecommunications network comprising:
a radio access network having a first control node and a second control node, each of the first control node and the second control node controlling at least one base station;
a signaling link connecting the first control node and the second control node;
wherein the second control node transmits cell information from the second control node to the first control node over the signaling link only when the cell information is not already known by the first control node, the cell information including a set of cell information parameters characterizing a specified cell served by a base station controlled by the second control node;

wherein the first control node sends a request message to the second control node and includes in the request message an index which is representative of the cell information deemed current by the first control node for the specified cell; and wherein the index is a counter whose value is changed when configuration data of the specified cell is changed.

43. The apparatus of claim 42, wherein the second control node determines whether the index included in the request message represents cell information which is deemed current by the second control node and, in the event of a negative determination, includes in a response message sent to the first control node the cell information deemed current by the second control node for the specified cell.

44. The apparatus of claim 42, wherein the second control node determines from a cell identifier for the specified cell whether the specified cell is a valid cell, in the event of an affirmative determination, includes in a response message sent to the first control cell an indication that the specified cell is not a valid cell.

45. The apparatus of claim 42, wherein the request message requests that the second control node allocate resources in the specified cell for a connection controlled by the first control node.

46. A telecommunications network comprising:
- a radio access network having a first control node and a second control node, each of the first control node and the second control node controlling at least one base station;
- a signaling link connecting the first control node and the second control node;
- wherein the second control node transmits cell information from the second control node to the first control node over the signaling link only when the cell information is not already known by the first control node, the cell information including a set of cell information parameters characterizing a specified cell served by a base station controlled by the second control node;
- wherein the first control node sends a request message to the second control node, the request message including a cell identifier for the specified cell, and wherein the second control node sends a response message to the first control node, the response message including both (1) the cell information deemed current by the second control node for the specified cell; and (2) an index which is representative of the cell information deemed current by the second control node for the specified cell; and
- wherein the cell information includes a set of cell information parameters which characterizes the specified cell and a set of cell information parameters which characterizes at least one neighboring cell, the neighboring cell being adjacent to the specified cell.

47. The apparatus of claim 46, wherein the request message includes a neighbor index which is representative of the cell information deemed current by the first control node for the neighboring cell.

48. The apparatus of claim 47, wherein the neighbor index is of a shorter length than the cell information for the neighboring cell.

49. The apparatus of claim 47, wherein the neighbor index is a counter whose value is changed when configuration data of the neighboring cell is changed.

50. The apparatus of claim 47, wherein the second control node determines from a cell identifier for the neighboring cell whether the neighboring cell is a valid cell and, in the event of an affirmative determination, includes in a response message sent to the first control node an indication that the neighboring cell is not a valid cell.

51. The apparatus of claim 47, wherein the request message requests that the second control node allocate resources in the specified cell for a connection controlled by the first control node.

52. The apparatus of claim 51, wherein the request message is one of a radio link setup request message and a radio link addition request message.

* * * * *